(12) United States Patent
Hopkins et al.

(10) Patent No.: US 10,776,723 B1
(45) Date of Patent: Sep. 15, 2020

(54) PROACTIVE TICKET RESERVATION SYSTEM

(71) Applicant: Amazon Technologies, Inc., Seattle, WA (US)

(72) Inventors: Joseph Hopkins, Seattle, WA (US); Jayden Lisa Feagins, London (GB); Ian W. Freed, Seattle, WA (US); Harry Sun, Mercer Island, WA (US); Geraldine Wilson, Newbury (GB)

(73) Assignee: Amazon Technologies, Inc., Seattle, WA (US)

( * ) Notice: Subject to any disclaimer, the term of this patent is extended or adjusted under 35 U.S.C. 154(b) by 807 days.

(21) Appl. No.: 15/265,747

(22) Filed: Sep. 14, 2016

(51) Int. Cl.
*G06Q 10/02* (2012.01)
*G06Q 10/08* (2012.01)

(52) U.S. Cl.
CPC ........... *G06Q 10/02* (2013.01); *G06Q 10/083* (2013.01)

(58) Field of Classification Search
CPC ................................... G06Q 10/083
USPC .................................... 705/5; 75/5
See application file for complete search history.

(56) References Cited

U.S. PATENT DOCUMENTS

| | | | | |
|---|---|---|---|---|
| 2010/0131530 A1* | 5/2010 | Gibson | ................. | G06Q 10/02 707/758 |
| 2013/0144663 A1* | 6/2013 | Qawami | ................ | G06Q 10/02 705/5 |
| 2013/0159125 A1* | 6/2013 | Flavel | ................ | G06Q 30/0603 705/26.1 |
| 2014/0129266 A1* | 5/2014 | Perl | ........................ | G06Q 30/02 705/5 |
| 2015/0066546 A1* | 3/2015 | Scarborough | .......... | G06Q 10/02 705/5 |
| 2015/0120341 A1* | 4/2015 | Scarborough | .......... | G06Q 10/02 705/5 |
| 2016/0203420 A1* | 7/2016 | Merriman | .............. | G06Q 10/02 705/5 |
| 2017/0178034 A1* | 6/2017 | Skeen | ................... | G06F 16/168 |
| 2017/0262511 A1* | 9/2017 | Calzada Gomez | .. | G06Q 10/109 |

OTHER PUBLICATIONS

Steward et. al., "Artist-fan engagement model: Implications for music consumption and the music industry", available at: http://acumen.lib.ua.edu/u0015/0000001/0001486/u0015_0000001_0001486.pdf (Year: 2013).*

* cited by examiner

*Primary Examiner* — Kevin H Flynn
*Assistant Examiner* — Emmett K. Walsh
(74) *Attorney, Agent, or Firm* — Lee & Hayes, P.C.

(57) ABSTRACT

An automated ticket reservation system proactively reserves tickets for a venue on behalf of customers who are identified as "fans" of the venue or an artist of an upcoming event at the venue. Subscribing customers to a proactive ticket reservation service can thereafter receive electronic notifications of tickets that have been proactively reserved for them based at least in part on a demonstrated interest in the venue or the artist of the upcoming event. The proactive ticket reservation system can determine that a subscriber is potentially interested in an event or a venue by analyzing customer data, including content streaming behavior and/or purchasing behavior of the subscriber.

20 Claims, 13 Drawing Sheets

324 http://www.site.com/ReserveTickets/Settings

Seating Preference:
- [x] General Admission
- [x] Balcony
- [ ] VIP

Search venue of interest: [Amazon Arena] 🔍

327 → View seat map at [Amazon Arena] to select seat preferences # of Seats Preference: ○ 1 ● 2 ○ 3 ○ 4

Price per Ticket Preference: [<$150 ▶]

Day of week preference:
| M | T | W | T | F | S | S |
|---|---|---|---|---|---|---|
|   |   |   |   | x | x |   |

Time of Day Preference: [5-9PM ▶]

What types of events are you interested in? (check all that apply):
- [x] Music Concerts
- [x] Plays
- [ ] Operas
- [ ] Musicals
- [x] Festivals
- [x] Sports [Expand to select specific sports ▶]
- [ ] Family shows
- [ ] Theater Only reserve tickets if the following friends can go with me: Add Friend from Social Network 326, 329, 331, 328, 330, 332

Fig. 3B

PROACTIVE TICKET RESERVATION SYSTEM

BACKGROUND

Buying tickets to an event (e.g., a live entertainment performance) can be a chaotic and anxious experience for most fans, especially when the event is a very popular one with a limited supply of tickets for a large fan base. Today, a common ticket purchasing scenario typically starts with an announcement that tickets for an event go on sale at a certain time on a certain day. A fan who is interested in buying one or more of those tickets is often required to login to a ticket purchasing website just prior to a sale window for customers to purchase tickets online. If the fan works during typical business hours, he/she is forced to inconveniently login from an employer's computer during his/her workday, as ticket sale windows inevitably begin in the middle of a workday (e.g., 9:00 AM on a weekday). Once the fan is logged-in to the website, his/her browser is directed to an electronic staging area, commonly referred to as a "waiting room," before the fan even has an opportunity to buy tickets. After waiting (sometimes hours) in the waiting room, the fan's browser exits the waiting room only to find that tickets have been sold out; many of the tickets having been already purchased by programmatic software entities (e.g., Internet bots). Even if tickets are still available at the expiration of the waiting room period, the fan is typically given a very short time window (e.g., 5 minutes or less) to purchase tickets by clicking through multiple pages on the ticket purchasing website and entering user information (e.g., a credit card number, a shipping address, a billing address, etc.), all of which must be completed within the very short time window.

Such a ticket purchasing process, in and of itself, is, for most people, a very stressful, and inconvenient process that is both time consuming and time pressured. Much of the reason that the ticket purchasing process is so stressful is because of today's Internet-centric dependence on the functional operation of technology (e.g., mobile devices, computer networks, browser software, website software, etc.) during such time-critical processes. This dependence on the functional operation of technology during a time-critical process is perhaps most evident when a ticket purchasing website crashes multiple times during the ticket sale window due to the overload on the web servers from a high number of contemporaneous user requests to access the ticket purchasing website. When a technology failure like this occurs, a fan is often forced to restart his/her browser session (often multiple times during the ticket sale window) only to find that, on each subsequent browser restart, he/she has been placed at the back of the electronic queue of users and bots, requiring the fan to wait even longer to buy a ticket. The time consuming and cumbersome ticket purchasing process that exists today only exacerbates these issues. Despite being designed for convenience, Internet-based technology has its limitations, such as the uncertainty of seamless network connectivity, the potential for critical software (e.g., the website, browser applications, etc.) to crash, which, in turn, makes purchasing tickets in today's Internet-centric environment all the more problematic for prospective ticket purchasers. Such technology limitations were non-existent in the pre-Internet world. Because of this, prospective ticket purchasers in the pre-Internet world did not have to worry themselves about whether technology will be functioning properly while waiting in line to purchase tickets at a physical box office.

Furthermore, a general lack of awareness of an artist's (or groups') touring schedule often impedes the discovery of an event that a fan would otherwise be interested in attending. Sometimes, people are not even aware of events in their area that they may enjoy. There is simply an overabundance of events, artists, and content, which makes it impossible for fans to keep track of every single event that they might be interested in attending. Fans often hear about an event after tickets for the event have already sold out, or even after the event has transpired. This lack of discovery adds unnecessary friction to the existing ticket purchasing process because a fan must continually check an artist's fan page, or otherwise iteratively search online, for touring schedule updates from artists they are interested in, lest they miss out on purchasing tickets for interesting events.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3B illustrates another example user interface for customizing settings for the proactive ticket reservation service.

DETAILED DESCRIPTION

Figure 1:
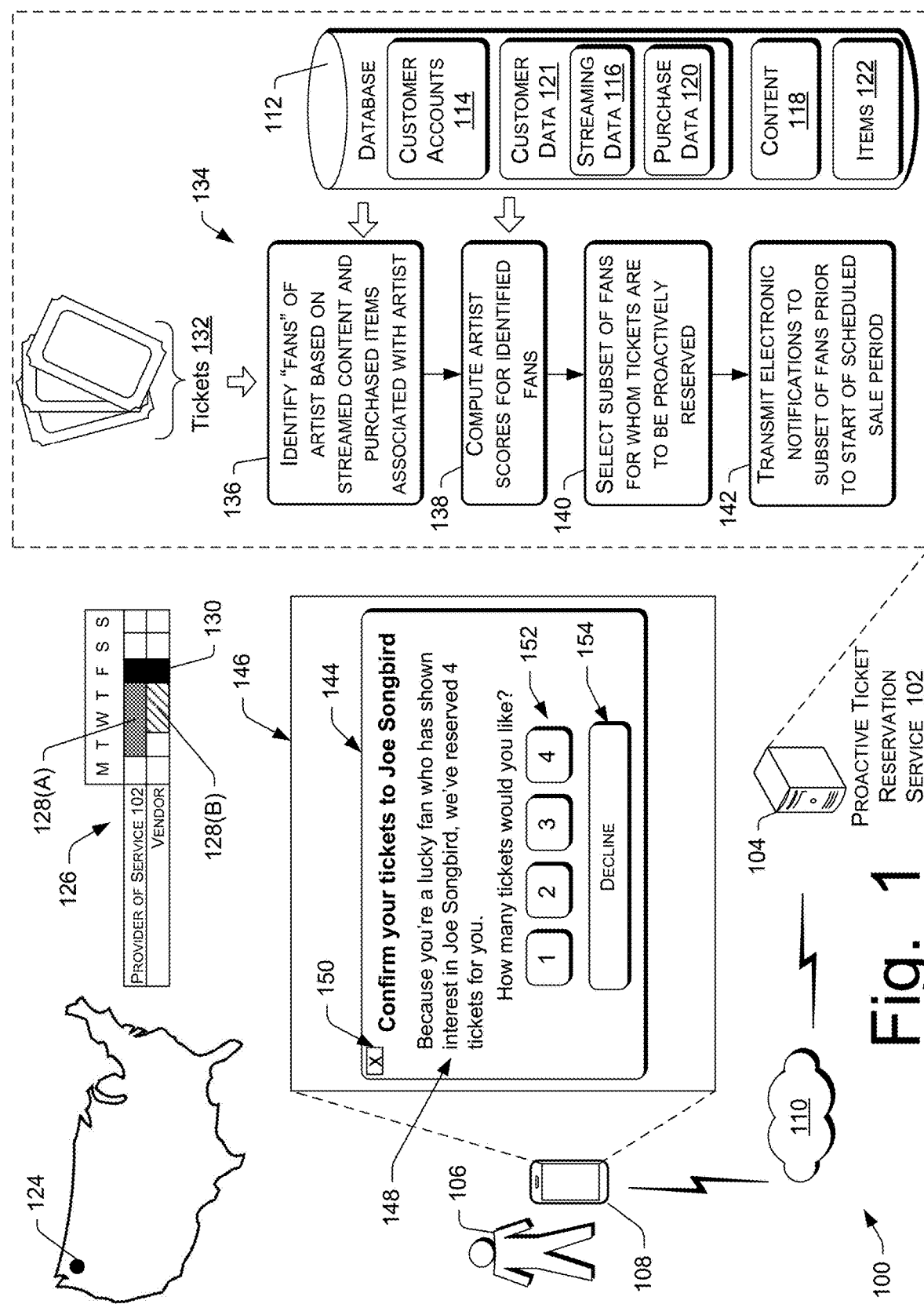
FIG. 1 illustrates an example computer environment for implementing a proactive ticket reservation service.

Embodiments of the present disclosure are directed to, among other things, techniques and systems for an automated ticket reservation system that is configured to reserve, prior to a scheduled sale period associated with a venue, tickets for access to the venue on behalf of customers who are identified as "fans" of the venue or an artist of an upcoming event at the venue. Customers can subscribe to a proactive ticket reservation service. These subscribing customers can thereafter receive electronic notifications of tickets that have been reserved for them based at least in part on a demonstrated interest in the venue or the artist of an upcoming event at the venue. The proactive ticket reservation system can determine that a subscriber is potentially interested in an upcoming event or a venue by analyzing content streaming behavior and purchasing behavior of the subscriber.

A provider of the proactive ticket reservation system (sometimes referred to herein as "the system") may initially receive an allocation of tickets associated with a venue. The provider can then utilize the system to reserve at least a portion of the tickets in the received allocation for a subset of subscribers who have demonstrated an interest in the venue or an artist of an upcoming event that is to occur at the venue. Prior to a start of a scheduled sale period associated with the venue, the system can determine a total number of tickets that are to be reserved for customers identified as potential "fans" of the venue or the artist of the upcoming event at the venue. The system can identify, by accessing customer data, such as streaming data and/or purchase data, maintained in a database accessible to the system, a plurality of customers associated with the venue or an artist of an upcoming event that is to occur at the venue. For example, the system can access streaming data to identify customers that have streamed content associated with the artist of the upcoming event, or purchase data to identify customers that have purchased one or more items associated with the artist or the venue. The system can select a subset of the plurality of customers and then transmit, over a computer network to a customer in the subset, prior to the start of the scheduled sale period, an electronic notification informing the customer that one or more tickets from the total number of tickets have been reserved for the customer to purchase.

The subscribing customers that receive an electronic notification of one or more reserved tickets can confirm their interest in purchasing the reserved ticket(s) by performing a user action any time during the specified time period. Thereafter, the customer's stored payment method available to the system can be charged, and the purchased ticket(s) can be made available to the customer. In some embodiments, the customer can set a preference for particular events to have one or more tickets reserved and purchased on their behalf without any user action, thereby adding even more convenience to an already streamlined process that improves upon existing ticket purchasing processes.

The techniques and systems disclosed herein circumvent, for a subset of subscribing customers, the existing ticket purchasing process, which is cumbersome, time consuming, time pressured, and often scheduled at an inconvenient time. The proactive ticket reservation service described herein provides a ticket purchasing process that is more reliable, more convenient, and less stressful, as compared to the existing ticket purchasing processes, at least because a subset of customers do not have to disrupt their work day to participate in an online ticket sale process that can take hours to complete and is often wrought with technological failures (e.g., crashing software, network connectivity issues, etc.). These technological failures that occur during such a time-critical process can altogether preclude a customer's ability to purchase a ticket to an upcoming event. The subset of customers for whom tickets are proactively reserved with the techniques and systems described herein are under less time pressure to purchase tickets by use of a much more reliable and streamlined process that is not as dependent on the functional operation of technology (i.e., a customer is given ample time to respond to electronic notifications of proactively reserved tickets, and can simply wait for a technology failure to resolve to confirm the purchase of proactively reserved tickets at a convenient time). This benefit is perhaps most appreciated for an event for which there is limited inventory of tickets and high customer demand. Furthermore, the proactive ticket reservation system, upon implementation, can conserve resources with respect to at least network bandwidth resources, processing resources, and/or other resources while providing mechanisms to proactively reserve tickets on behalf of selected customers. For example, the proactive ticket reservation system can reduce the processing resources and network bandwidth resources consumed during a typical sale period for tickets to an event by taking a large portion of the fan base offline to purchase tickets prior to the general sale window in a less time-intensive process where a high number of users are not simultaneously accessing a website and overloading web servers. Technical effects other than those mentioned herein can also be realized from an implementation of the technologies disclosed herein.

The techniques and systems disclosed herein also provide for the discovery of upcoming events by potentially interested customers. With the proactive ticket reservation system (service) described herein, customers will no longer have to continually check an artist's (or group's) fan page, or iteratively search online, for touring schedule updates, thereby reducing network bandwidth consumption and processor load on computer networks. Customers will also no longer have to experience the disappointment of missing out on tickets to an event that they are interested in attending. The notification aspects of the proactive ticket reservation system allow for customers to be apprised of upcoming events of interest, and gives the customers a better opportunity to purchase tickets, through an easy-to-use interface, without having to go to the secondary marketplace to obtain tickets.

In general, systems and non-transitory computer-readable media are disclosed herein that store one or more modules executable by one or more processors to perform the various processes disclosed herein. For purposes of discussion, examples used herein are provided primarily for illustrative purposes. For example, the proactive ticket reservation service is often described herein with reference to a live music concert. However, it is to be appreciated that the techniques and systems described herein may be implemented in other contexts outside of live music concerts, such as any event—whether a live performance event or a showing of pre-recorded content (e.g., a movie shown at a movie theater) at a certain date and time—for which tickets can be purchased in advance to gain entrance to a venue. "Venue," as used herein, can mean a place, location, or area of restricted access (i.e., exclusively accessible to people in possession of appropriate tickets) to an attraction. For example, the attraction can comprise an event, such as a concert, conference, or sports event occur. Other examples of attractions at a venue are entertainment attractions (e.g., rides and carnival games at a theme park), art, sculptures, or other types of exhibits at a museum, or gallery, and so on. Therefore, an upcoming event is not a prerequisite for proactively reserving tickets to a venue. For example, tickets to a theme park with rides and other entertainment attractions that are expected to sell out on a given holiday can be proactively reserved for a subset of customers by the techniques and systems described herein, even though there may not be a specific event that is to occur at the theme park venue.

FIG. 1 illustrates an example computer environment 100 for implementing a proactive ticket reservation service 102 (sometimes "ticket reservation service 102"). In general, a service-provider (or "provider") can implement the proactive ticket reservation service 102, at least partly, via one or more computing devices 104 equipped with a processor(s) and memory storing modules, components, programs, instructions, and the like, that are executable by the processor(s) for carrying out various aspects of the proactive ticket reservation service 102. Thus, the computing device(s) 104 can represent a proactive ticket reservation system, sometimes abbreviated herein to "the ticket reservation system," or "the system." Customers of the proactive ticket reservation service 102, such as the customer 106, can subscribe to, or otherwise utilize, the proactive ticket reservation service 102 in order to receive electronic notifications of tickets that have been proactively reserved for the customers based at least in part on the customer 106 demonstrating an interest in an artist of an upcoming event. For example, the customer 106 may represent a person who is generally interested in attending upcoming events, such as live performance events where an artist(s) perform live, at a venue, in front of an audience. Thus, the customer 106, by subscribing to, or otherwise registering with, the proactive ticket reservation service 102, can thereafter receive electronic notifications informing the customer 106 that one or more tickets to an upcoming event have been reserved on his/her behalf based on a demonstrated interest, by the customer 106, in the artist for the event. The terms "users," "consumers," "customers," or "subscribers" may be used interchangeably herein to refer to customers, such as the customers 106. Furthermore, "artist," is used herein to denote any entity that is associated with a performance at a venue or an event at the venue. For example, an artist can comprise any type of performing entity that performs at a venue for a live performance (e.g., a singer, a band, an athlete, a sports team, etc.). As another example, an artist can comprise a creator of content that is to be presented at the venue, such as a playwright, producer, designer, choreographer, and the like, associated with content that is performed by live actors, or pre-recorded content (e.g., a movie). As such, an artist can comprise any suitable entity, such as one or more individuals, a corporation, group, and so on.

The customer 106 can be associated with a networked computing device(s) 108 (sometimes referred to herein as a "client device 108") that is configured to access systems and services over a computer network 110. The networked computing device(s) 108 may be implemented as any number of computing devices, including, without limitation, a personal computer, a laptop computer, a desktop computer, a portable digital assistant (PDA), a mobile phone, tablet computer, an electronic book (eBook) reader device, a set-top box, a game console, a voice-controlled speaker assistant device, a smart television, a wearable device (e.g., a smart watch, electronic "smart" glasses, a fitness tracker, etc.), or any other electronic device that can transmit/receive data over the computer network(s) 110. FIG. 1 shows an example networked computing device 108 in the form of a mobile phone.

The computer network(s) 110 is representative of many different types of networks, and may include wired and/or wireless networks that enable communications between the various computing devices in the environment 100. In some embodiments, the computer network(s) 110 may include cable networks, the Internet, local area networks (LANs), wide area networks (WAN), mobile telephone networks (MTNs), and other types of networks, possibly used in conjunction with one another, to facilitate communication between the networked computing device(s) 108 and any other computing device, such as the computing device 104 of the proactive ticket reservation service 102. Although embodiments are described in the context of a web based system, other types of client/server-based communications and associated application logic could be used.

The proactive ticket reservation service 102 can be part of a larger system that a provider uses to provide various additional services. Such additional services can include, without limitation, streaming services to stream content (e.g., audio content, video content, etc.), electronic commerce (e-commerce) services to purchase items electronically via an electronic marketplace, and/or other services. The customer 106 can utilize his/her networked computing device(s) 108 to access one or more of these services over the computer network 110. For example, the customer 106 can stream music over the computer network 110 by sending a streaming request from the networked computing device 108 to the computing device(s) 104 over the computer network 110, and receiving, in response, from the computing device(s) 104, streamed data (e.g., a streamed audio file) via the computer network 110, which is ultimately played back on an output device (e.g., speaker(s)) of the networked computing device 108. Similarly, the customer 106 can utilize his/her associated networked computing device 108 to access an electronic marketplace provided by the computing device(s) 104. The customer 106 can conduct electronic transactions for items available in the electronic marketplace over the computer network 110. Additionally, or alternatively, the customer 106 can utilize his/her associated networked computing device 108 to access similar additional services provided over the computer network 110 by other service providers that are different from the provider of the proactive ticket reservation service 102.

The computing device(s) 104 used for implementing the proactive ticket reservation service 102 can maintain, and/or have access to, a database 112 where data relating to customers, such as the customer 106, is maintained for future reference by virtue of the computing device(s) 104 accessing the database 108. For example, the database 112 can maintain customer accounts 114 for a plurality of customers, such as the customer 106. In some instances, the customer accounts 114 represent accounts of customers 106 who have explicitly subscribed to the proactive ticket reservation service 102. In other instances, the customer accounts 114 can represent accounts of customers 106 who have more generally registered with a provider, but who have not yet opted into the proactive ticket reservation service 102. Any suitable customer data can be stored in the database 112 in association with the customer accounts 114, such as credentials (e.g., username and password), stored payment methods (e.g., payment instruments such as credit cards, debit cards, gift cards, etc.), shipping address information, billing address information, shipping options (e.g., preferred method of delivery of items), and/or any other customer-related data. For customers 106 who have subscribed to the proactive ticket reservation service 102, customer data stored in association with customer accounts 114 of those customers 106 can include preference and settings information relating to the proactive ticket reservation service 102 itself.

As customers 106 stream content over the computer network 110 with their associated networked computing device(s) 108, the computing device(s) 104 can collect, and store in the database 112, streaming data 116 relating to the content that was streamed over the computer network 110 by the networked computing device(s) 108. "Content," as used herein can include, without limitation, audio files (e.g., music files, book narrations, etc.), video files (e.g., music videos, movies, television shows, short clips, etc.), or any similar type of "streamable" content that can be "played back" via an output device of the networked computing device 108. The streaming data 116 itself can include data relating the streamed content, such as an identifier of the content (e.g., song title, video title, file name, or other identifier), a name of the artist who created the content or the artist that the content is about (e.g., a singer, composer, actor, writer, group/band name, etc.), a length of time for playback of a content file, a file size of the content file, and so on. The streaming data 116 can also include data relating to attributes of the streaming action taken by the networked computing device 108, such as a date and time that the content was streamed on the device 108, a device identifier of the networked computing device 108 that streamed the content, a data rate at which the content was streamed on the device 108, and so on.

The streaming data 116 can also include statistics that can be measured based on the streamed content. Such streaming statistics can include, without limitation, a playback statistic indicating an amount of time (e.g., number of minutes) the content was streamed, a data statistic indicating an amount of data consumed over the computer network 110 while streaming the content with the networked computing device 108, and so on. Over time, these statistics can be aggregated and/or broken down at any suitable level according to any suitable attribute of the content that was streamed. Such attributes by which the streaming statistics can be broken down is by customer 106, by artist, by genre of content (e.g., genre of music), by the provider/source of the content, by the date the content was created, by the networked computing device 108 that streamed the content, or by the type of networked computing device 108 that streamed the content, and so on. For example, a streaming statistic can comprising an amount of time (for a given period of time) that music from Joe Songbird was streamed by a mobile phone of the customer 106 over the computer network 110. Thus, the statistics included in the streaming data 116 can be aggregated and/or broken down at any suitable level of granularity.

In some embodiments, the database 112 can maintain a library, or repository, of content 118 that can be provided (streamed) directly from the computing device(s) 104 of the proactive ticket reservation service 102 over the computer network 110. Thus, the computing device(s) 104 can track, collect, and store the streaming data 116 as the content 118 is accessed for streaming to various networked computing devices 108 over the computer network 110. However, in some implementations where content is streamed from other sources, a client-side application of the networked computing device 108 can be configured to track streaming data relating to content that is provided (streamed) from other service providers and sources that are different from the provider of the proactive ticket reservation service 102. Accordingly, the client-side application of the networked computing device 108 can be configured to periodically transmit, after receiving user consent, the streaming data to the computing device(s) 104 over the computer network 110 for storage as the streaming data 116 in the database 112.

As customers 106 purchase items from one or more electronic marketplaces via the computer network 110, the computing device(s) 104 can also collect, and store in the database 112, purchase data 120 relating to items that were purchased over the computer network 110 by the networked computing device 108. "Items," as used herein, may include tangible items, intangible items, products, goods, services, a bundle of items, digital goods or services that are downloaded (e.g., media clips), sellable units, events, or anything else which might be consumed, purchased, rented, subscribed to, leased, loaned or viewed (hereinafter "acquired") physically, digitally or otherwise via a payment transaction. The purchase data 120 can include attributes of the item itself, such as an identifier of an item (e.g., a serial number, name of the item, etc.), the merchant who sold the item via the electronic marketplace, or an artist (e.g., an artist, singer, composer, actor, writer, group/band name, etc.) associated with the item, such as an artist of music stored as a digital audio file or a physical medium (e.g., a compact discs (CD). The purchase data 120 can also include attributes of transactions, such as a date and time at which a purchase of an item was completed, shipping address used for delivering the item, payment method used to purchase the item, shipping options used for delivery of the item, and so on.

The purchase data 120 can also include statistics that can be measured based on items purchased over the computer network 110. Such purchase statistics can include, without limitation, a quantity statistic indicating a number of items purchased, a monetary statistic indicating a dollar amount spent on items that were purchased, and so on. These purchase statistics can be aggregated and/or broken down according to any suitable attribute, such by customer, by artist, by genre, by the merchant who sold the item, by the date the item was made available in the electronic marketplace, by the networked computing device 108 that was used to purchase the item, and so on. For example, a purchase statistic can comprise a number digital files and/or CDs associated with Joe Songbird that were purchased (for delivery or download) using a mobile phone of the customer 106 over the computer network 110.

The database 112 can maintain a catalog, or repository, of items 122 that can be made available within an electronic marketplace provided by the computing device(s) 104 of the proactive ticket reservation service 102 directly. Furthermore, the items 122 in the catalog can be associated with any number of attributes, an artist associated with the item (e.g., Joe Songbird merchandise). As such, the computing device(s) 104 can track the purchase data 120 as the computing device(s) 104 is used to facilitate transactions over the computer network 110. However, in some implementations where items available from other sources and providers are purchased by the customers 106, a client-side application of the networked computing device 108 may be configured to track purchase data generated as a result of purchasing other items over the computer network 110 from other service providers that are different from the provider of the proactive ticket reservation service 102. Accordingly, the client-side application of the networked computing device 108 can be configured to periodically transmit, after receiving user consent, purchase data to the computing device(s) 104 over the computer network 110 for storage as the purchase data 120 in the database 112.

In general, as customers 106 access sites and other sources of content over the computer network 110 with their networked computing device(s) 108, the computing device(s) 104 can collect, and store in the database 112, any type of customer data 121 that relates to observable behavior carried out by the customer 106. Such customer data 121 can include the streaming data 116 and the purchase data 120, as described herein, as well as other customer data 121, such as social media behavior (e.g., "likes," "posts," and/or "sharing" of a fan-page of the artist), or any similar observable online behavior, such as a customer review of a venue or show that the customer attended.

As events are scheduled by promoters, artists, and other entities in charge of scheduling events, a provider of the proactive ticket reservation service 102 may receive notification of an upcoming event, including the event details, such as a date, a time, and a location/venue of the event. An example upcoming event is shown in FIG. 1 merely for illustrative purposes. The event depicted in FIG. 1 can represent, for example, a stop on the "Joe Songbird World Tour" that is to take place in Seattle, Wash. The event details for such an event can include a venue 124, such as Amazon Arena, and/or a location, such as Seattle, Wash., U.S.A., as well as a date and time, such as June 11, at 21:00.

Furthermore, the provider of the proactive ticket reservation service 102 may receive a total number of tickets that have been allocated to the provider of the proactive ticket reservation service 102 to distribute to its customers 106. "Tickets," as used herein, can comprise any physical or digital item used by a person in possession of the ticket to gain admission to an event. For example, a ticket can be a piece of paper with identifying information printed thereon (e.g., a code, such as a machine-readable bar code, alphanumeric code, etc.). As another example, a ticket can be an electronic document, such as an email, a file (e.g., a portable document format (pdf) file), a text message, and so on, including identifying information (e.g., a code, such as a machine-readable bar code, alphanumeric code, etc.).

The provider can also receive a schedule 126 indicating various upcoming sub-events relating to the upcoming event. The sub-events in the schedule 126 can include, without limitation, an announcement of the event, as well as one or more pre-sale windows 128(A) and 128(B), and a general sale window 130. The example schedule 126 for the upcoming event shown in FIG. 1 illustrates a first pre-sale window 128(A) that is scheduled for the provider of the proactive ticket reservation service 102. In the example of FIG. 1, the first pre-sale window 128(A) begins on Tuesday and ends on Thursday. The schedule 126 also shows a second pre-sale window 128(B) for a different ticket vendor that begins on Wednesday and ends on Thursday. Each of the pre-sale windows 128(A) and 128(B) occur prior to the general sale window 130 that takes place on Friday. The general sale window 130 can represent a time window when tickets go on sale to the general public, while the pre-sale windows 128(A) and 128(B) can represent time windows where a particular group of customers are provided an opportunity to buy tickets to the upcoming event before the general public is provided an opportunity to buy tickets. These sale windows (128, 130), in general, are meant to represent time windows for carrying out an existing ticket purchasing process where customers are forced to login to a ticket purchasing website at inconvenient times of the day (e.g., during work hours) to compete with other users for tickets to the upcoming event.

Upon receiving an allocation of tickets from a promoter of an upcoming event, the provider of the proactive ticket reservation service 102 can designate all, or a portion, of the tickets it receives as the tickets 132 that are to be proactively reserved on behalf of its customers 106. In the case where the provider allocates a portion of the received tickets for proactive reservation, the provider can make the remaining tickets in the allocation available to its customers 106 during the pre-sale window 128(A), which affords customers 106 who aren't assigned a ticket through the proactive ticket reservation process a fair chance of obtaining a ticket through the provider. Whether all or some of the received tickets are designated for use in the proactive ticket reservation process, the system starts with a number of "N" tickets 132 that are to be proactively reserved for customers 106 who have demonstrated an interest in the artist of the upcoming event.

An example technique for proactively reserving tickets on behalf of a subset of customers 106 will now be described with reference to FIG. 1. In general, a proactive ticket reservation process 134 may involve little to no customer interaction (i.e., very minimal user input, or no user input). Furthermore, the process 134 is triggered automatically by the proactive ticket reservation service 102 prior to an initial sale window or period (e.g., the pre-sale window 128(A) shown in FIG. 1). For example, in response to receiving information relating to an upcoming event, and at any suitable time prior to the pre-sale window 128(A), the proactive ticket reservation service 102 can trigger the process 134 by which a number of tickets 132 for the upcoming event are proactively reserved for customers 106 that the proactive ticket reservation service 102 identifies as potential "fans" of the upcoming event.

At 136, prior to a start of a scheduled sale period (e.g., the scheduled pre-sale window 128(A)) associated with a venue (e.g., where an upcoming event relating to an artist is to occur), the proactive ticket reservation service 102 can identify, by accessing the customer data 121 maintained in the database 112, a plurality of customers 106 associated with the venue or an artist of an upcoming event that is to occur at the venue. For example, as illustrated at 136 of FIG. 1, the customers 106 can be identified as being associated with the artist by the streaming data 116 indicating that the customers 106 have streamed content 118 associated with the artist, or by the purchase data 120 indicating that the customers 106 have purchased items 122 associated with the artist. As another example, the plurality of customers 106 can be identified as being associated with the venue by the purchase data 120 indicating that the customers 106 have purchased items 122 associated with the venue (e.g., a theme park). At 138, the proactive ticket reservation service 102 computes respective scores (sometimes referred to herein as "artist scores") for the plurality of customers 106 identified at 136. Computation of an artist score for an individual customer 106 can be based at least in part on a first statistic exhibited in the streaming data 116 relating to the content 118 associated with the artist that was streamed by the individual customer 106 and a second statistic exhibited in the purchase data 120 relating to the item(s) 120 associated with the artist that were purchased by the individual customer 106. In some configurations, the score can be determined based on a weighted formula that computes the score as a function of the first statistic (e.g., an amount of time the content 118 associated with the artist was streamed by the individual customer 106) and the second statistic (e.g., the number of the items 122 associated with the artist that were purchased by the individual customer 106).

At 140, the proactive ticket reservation service 102 selects a subset of the plurality of customers 106 for whom tickets are to be proactively reserved. The selection of the subset of customers at 140 can be based at least in part on a random lottery, on the respective artist scores computed at 138, or a combination thereof.

At 142, an electronic notification 144 can be transmitted over the computer network 110 to a customer 106 in the subset selected at 140, prior to the start of the scheduled sale period (e.g., the pre-sale window 128(A)). FIG. 1 illustrates an example of the electronic notification 144 that can be received, and output, by the networked computing device 108. In the example of FIG. 1, the electronic notification 144 is shown as being output on a display 146 of the networked computing device 108, but electronic notifications, as described herein, are not limited to being output on a display. For example, a message can be output via a speaker of the networked computing device 108 using text-to-speech conversion on the device 108, or via a printer, a projector, and so on. The electronic notification 144 can be used to inform the customer 106 that one or more tickets from the total number of tickets 132 have been proactively reserved for the customer 106 to purchase before an expiration of a specified time period that starts upon transmitting the electronic notification 144 and that expires at or before the start of the scheduled sale period 128(A). In the example electronic notification 144 of FIG. 1, this information is provided in the form of a text-based message of a push notification that a client application executing on the networked computing device 108 causes to be displayed on the display 146.

The electronic notification 144 can further include logic configured to provide various interactive elements that the customer 106 can select via user input to the display 146, or by other input mechanisms (e.g., speech input). For example, a "dismiss" button 150 can be selected by the customer 106 if the customer would like to dismiss and ignore the electronic notification 144, at least for the time being. Additional interactive elements shown in the electronic notification 144 include one or more selectable options 152 (shown as four square-shaped soft buttons, numbered 1, 2, 3, and 4, respectively) to purchase one or more tickets in the set of tickets assigned to the customer 106. In this example, the system proactively reserved four tickets for the customer 106, and thus, the selectable options 152 include four interactive elements corresponding to the desired number of tickets that the customer 106 can specify a confirmation to purchase. For example, the customer 106 can select the selectable option 152 with the number "4" to indicate a confirmation to purchase all four of the proactively reserved tickets. Alternatively, the customer 106 can select one of the other selectable options 152 with the numbers "1", "2", or "3" to select some, but not all, of the proactively reserved tickets. Another interactive element in the electronic notification 144 comprises a "decline" button 154 that, upon selection, can indicate the customer's 106 desire to affirmatively decline the option to purchase the proactively reserved tickets.

The customer 106 can be given a specified time period in which to confirm (e.g., via selection of one of the selectable options 152) or decline (via selection of the "decline" button 154) the purchase of one or more of the tickets that have been proactively reserved for the customer 106. This specified time period can be configurable, but, in general, can be configured at a time period that is ample, as compared to a typical time period of 5 minutes or less that is given to prospective ticket purchasers using today's ticket purchasing process involving the aforementioned "waiting room." In some implementations, the specified time period for the customer 106 to respond to the electronic notification 144 is about 24 hours, which gives the customer 106 plenty of time to decide whether they want to purchase tickets, and how many tickets they want to purchase. Furthermore, the customer 106 can effectuate a purchase of the proactively reserved tickets with a simple user action (e.g., an affirmative reply/response to the electronic notification 144, such as a "yes" reply to an SMS text notification), and without having to login to a website at an inconvenient time and spend potentially hours competing with other users and bots for tickets to an upcoming event. In some embodiments, the customer 106 may possess (e.g., by having previously purchased from the provider of the service 102) a physical button that can be situated in a vicinity of the customer 106 (e.g., on a wall of the customers 106 home) and which is wirelessly connected to a wireless network accessible to the physical button. This physical button can be programmed to purchase tickets that have most recently been reserved for the customer 106. Accordingly, the customer 106 can press the physical button to confirm the purchase of one or more tickets that are proactively reserved for him/her. Thus, the proactive ticket reservation service 102 creates a much more convenient ticket purchasing experience for a customer 106 who is selected at 140, and the proactive ticket reservation process 134 is more tolerant of technology failures that would otherwise adversely impact customers participating in the traditional ticket purchasing process (e.g., network outages, crashing browsers, websites, and so on.) That is, if and when a technology failure (e.g., a network outage) occurs, prohibiting the customer 106 from receiving the electronic notification 144 and/or replying to the notification 144, the system can wait for a resolution to the technology failure, which typically can be resolved in much less time than a 24 hour period, to send the electronic notification 144 when functional operation of relevant technology is restored, and/or receive a response to the electronic notification 144 from the networked computing device 108.

Figure 2:
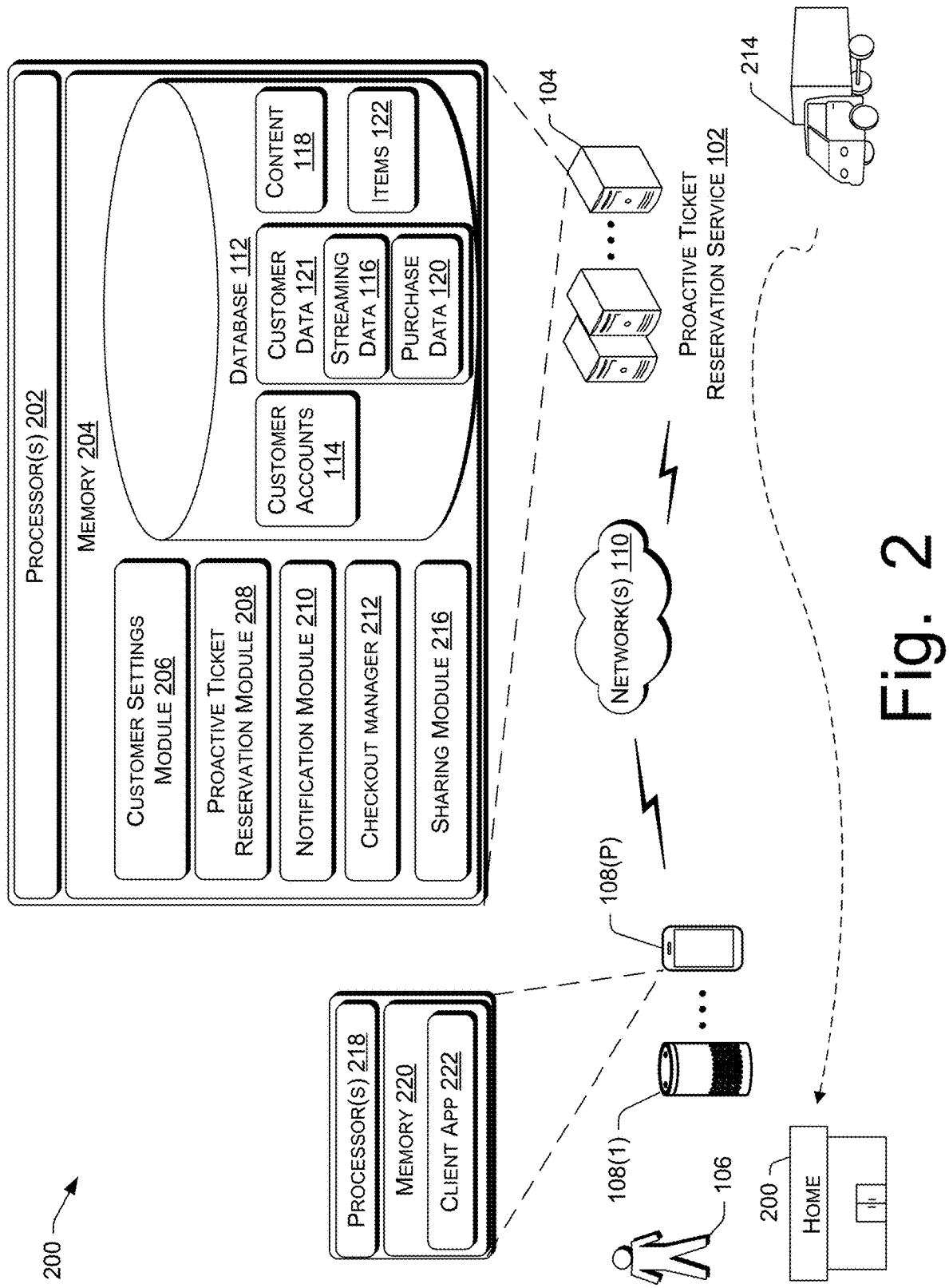
FIG. 2. illustrates an example environment in more detail for implementing the proactive ticket reservation service.

FIG. 2 illustrates an example environment 200 in more detail for implementing the proactive ticket reservation service 102. In the environment 200, the customer 106 is shown in association with one or more networked computing devices 108(1) . . . 108(P) (collectively 108). For example, the networked computing device 108(1) represents a digital assistant device that receives speech input from the customer 106, provides audio output to the customer 106 via one or more speakers, and is network connected to send/receive data to/from other devices over the computer network 110. The customer 106 can be associated with a "home" 200 (e.g., house, apartment, condominium, etc.) where the customer 106 typically has physical products delivered. For example, tickets purchased through the proactive ticket reservation service 102 can be delivered to the customer's 106 home 200. The home 200 can be associated with a physical mailing address that the customer 106 can provide as a default shipping address for storage in association with the customer account 114 of the customer 106.

The computing device(s) 104 of the proactive ticket reservation system, which may comprise one or more server(s) arranged in a cluster or as a server farm, and across multiple fleets, may be maintained and/or operated by a service-provider of the proactive ticket reservation service 102. The computing device(s) 104 are shown as being equipped with one or more processors 202 and one or more forms of computer-readable memory 204. Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, compact disc read-only memories (CD-ROMs), digital video discs (DVDs), read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

The computer-readable memory 204 may be used to store any number of functional, or executable, components, such as programs and program modules that are executable on the processor(s) 202 to be run as software. Each component stored in the computer-readable memory 204 may comprise computer-executable instructions that, when executed, cause the one or more processors 202 to perform acts and to implement techniques described herein. Each component may be in the form of data structures, program modules, or other data.

The modules stored in the computer-readable memory 204 may include a customer settings module 206 to provide a user interface for a customer 106 to manage settings associated with the proactive ticket reservation service 102 and provide preferences related to the proactive ticket reservation service 102. For example, the customer settings module 206 can generate a user interface that allows a customer 106 to opt-in or opt-out to/from participation in the proactive ticket reservation service 102, set preferences for a preferred channel (e.g., email, short message service (SMS) text, push notifications, voice, etc.) to receive electronic notifications about proactively reserved tickets, a distance from a default shipping address the customer is willing to travel to go to an event, as well as artists of interest, seating preferences, day of week preferences, and so on.

Figure 3A:
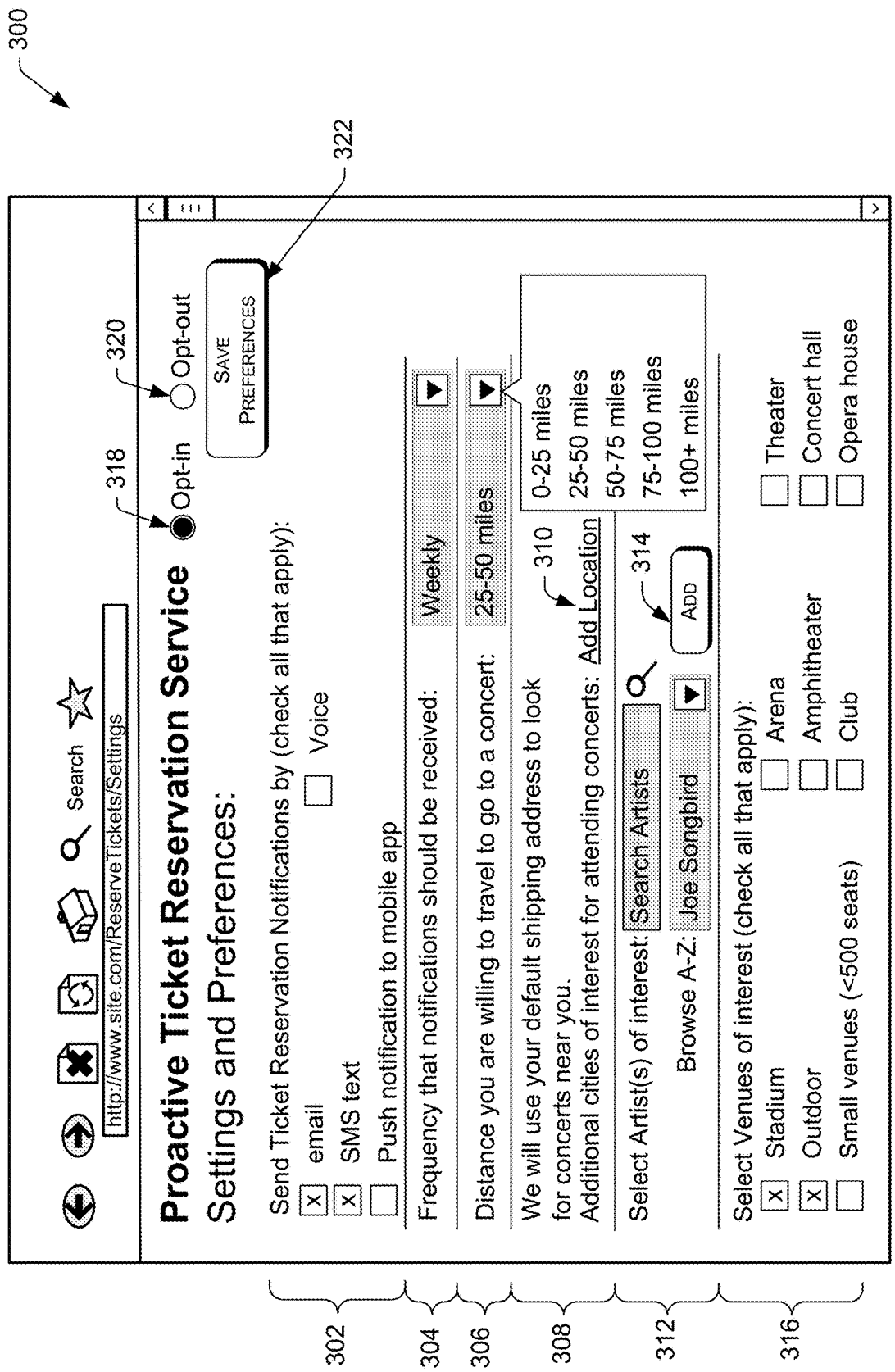
FIG. 3A illustrates an example user interface for customizing settings for the proactive ticket reservation service.

Turning briefly to FIG. 3A, a settings and preferences user interface (UI) 300 is shown that can be generated by the customer settings module 206 and served to networked computing devices 108. The customer settings module 206 can be configured to expose, on a networked computing device 108 that accesses the computing device(s) 104 over the computer network(s) 110 (e.g., in response to the device 108 accessing a website or a client application of the provider of the proactive ticket reservation service 102), the UI 300 allowing a customer 106 to input settings and preferences that are used by the proactive ticket reservation service 102. The UI 300 can be generated by the customer settings module 206 in the form of a Web browser or other browser (client application interface) that can format text based on hypertext markup language (HTML) code. The browser or client application may be stored and executed locally on the networked computing device 108, and the data for generating the UI 300 via the browser or client application can be provided remotely by the computing device(s) 104, such as over the computer network 110.

The UI 300 can include a preferred channel section 302 that presents a list of choices for selection by the customer 106 regarding a preferred channel by which to receive electronic notifications, such as the electronic notification 144 of FIG. 1. The preferred channel section 302 depicts examples such as "email", "SMS text", "push notification to mobile app", and "voice" that can be presented for selection by the customer 106. Voice notifications can be issued on any suitable type of networked computing device 108 with a speaker(s), and may be controlled by a digital assistant executing on the device. In the example of FIG. 3A, the customer 106 has selected both email and SMS text in the preferred channel section 302, which means that the customer 106, upon having one or more tickets proactively reserved for him/her for an upcoming event, will receive an email version of the electronic notification 144 and an SMS text version of the electronic notification 144 informing the customer 106 that ticket(s) for the upcoming event have been proactively reserved for him/her. Of course, the types of channels presented in the preferred channel section 302 of FIG. 3A are not limiting on the types of channels that can be presented in section 302, and other types of channels based on other technologies are contemplated herein.

The UI 300 can further include a preferred frequency section 304 that provides the customer 106 the ability to specify a maximum frequency at which the customer 106 would like to receive electronic notifications, such as the electronic notification 144 of FIG. 1. For example, the customer 106 could specify, via a drop-down menu in the preferred frequency section 304, a maximum frequency of weekly, monthly, bi-monthly, semi-annually, annually, and so on. Here, the customer 106, in the example of FIG. 3A, has selected a weekly cadence to receive electronic notifications of proactively reserved tickets. In the absence of an explicit preference, the system can choose a default frequency at which electronic notifications will be provided to the customer 106, such as monthly.

The UI 300 can further include preferred travel distance section 306 that provides the customer 106 the ability to specify a maximum distance—as measured from a default shipping address—the customer 106 is willing to travel to go to an event. For example, the customer 106 could specify, via a drop-down menu in the preferred travel distance section 306, a maximum distance—specified as a range of distance, such as 0-25 miles, 25-50 miles, 50-75 miles, 75-100 miles, 100 or more miles, and so on—the customer 106 is willing to travel from a default shipping address. Here, the customer 106, in the example of FIG. 3A, has selected a maximum of 50 miles (by selecting 25-50 miles from the drop-down menu). In the absence of an explicit preference, the system can choose a default maximum distance for the customer, such as 0-25 miles.

The UI 300 can further include an add location section 308 for the customer 106 to add locations of interest. For example, the customer 106 might frequently travel to a family member's hometown or a work-related destination that is different from the customer's hometown, and may therefore be interested in receiving proactively reserved tickets for upcoming events near the different location. Accordingly, a selectable link 310 can be provided in the add location section 308 to add a different/new location of interest, and the proactive ticket reservation service, upon receiving information about an upcoming event in the different location, can consider the customer 106 for inclusion in the subset of customers 106 for whom tickets are proactively reserved for the upcoming event in the different location, notwithstanding the fact that the customer 106 does not live in the different location.

The UI 300 can further include an artist preference section 312 that allows the customer to search for, and/or browse, artists that they can add to a list of artists that the customer 106 is interested in. For example, the customer can browse a list of artists, or enter keywords into a search field, to discover the artist, Joe Songbird, and can add Joe Songbird, to a list of artists via an add button 314, or similar input mechanism. The proactive ticket reservation service 102 can utilize this list of artists for the customer 106 as an explicitly provided signal that the customer 106 should be considered for selection in a group of customers 106 for whom tickets to an Joe Songbird concert will be proactively reserved. In some embodiments, the artist preference section 312 can be used as a mechanism for automatically purchasing tickets on behalf of the customer 106 without any user action from the customer 106. For example, if the customer 106 specifies Joe Songbird in the artist preference section 312, the system can take this as explicit consent to purchase tickets to an upcoming Joe Songbird concert that are proactively reserved for the customer 106. In this scenario, the customer 106 does not have to provide any explicit confirmation to purchase proactively reserved tickets, and the customer 106 can receive an electronic notification that one or more tickets to an upcoming event have been purchased, rather than an electronic notification that the one or more tickets are merely reserved for them. In some embodiments, the artist preference section 312 can provide the customer 106 the ability to rank artists by the customer's 106 level of interest in selected artists, or provide a star rating for individual artists, or similar mechanisms for rating artists.

The UI 300 can further include a venue preference section 316 that provides a list of venue types of different capacities for the customer 106 to select, such as stadium, outdoor, small venues (e.g., less than 500 seats), arena, amphitheater, club, theater, concert hall, opera house, and so on. In the example of FIG. 3A, the customer has specified a preference for stadium and outdoor venue types.

The UI 300 can further include an opt-in 318 and an opt-out 320 selection mechanism to opt-in or opt-out of the proactive ticket reservation service 102. In this manner, the customer 106 can choose whether to be considered for proactive ticket reservations for upcoming events or not. The UI 300 can also include a button 322 to save settings and preferences that have been specified via the UI 300.

FIG. 3B illustrates another example UI 324 that can be generated by the customer settings module 206 for customizing settings for the proactive ticket reservation service 102. The UI 324 can represent the same UI 300 shown in FIG. 3A after the customer 106 has scrolled down farther in the UI 300 or navigated to a "next page" for settings.

The UI 324 can include a seating preference section 326 that provides a list of seating types that most venues of events provide. For example, the list of seating types can include, general admission, balcony, VIP, and similar seating types for selection as preferred seating types by the customer 106. Here, the customer 106 has selected general admission and balcony seating as preferred types of seating that the proactive ticket reservation service 102 is to consider in proactively reserving tickets for the customer 106. The seating preference section 326 can also provide the ability for the customer 106 to search for (or browse) venues of interest, and the customer settings module 206 can provide a link 327 that directs the customer's 106 browser to a seating map or a seating chart for a venue of interest. Alternatively, selection of the link 327 can expand an embedded seating map or chart. The seating map or chart can allow the customer 106 to view and select sections, rows, and/or seats of interest at any level of granularity for a particular venue of interest in order to specify a seating preference.

The UI 324 can include a number of seats preference section 329 that provides the customer 106 with the ability to select a number of seats they prefer for a given event. This number of seats preference can tie into the ticket reservation process in a number of ways. For example, the number of tickets that are assigned to the customer 106 for an upcoming event can comprise a number of tickets that corresponds to the number of seats selected in the number of seats preference section 329. Alternatively, if the customer 106 receives an offer to purchase multiple reserved tickets and confirms the purchase using a relatively simple input mechanism, such as by pushing/actuating a physical button that is wirelessly connected to a wireless network of the user's home, the service can determine a number of tickets to purchase on behalf of the customer 106 by referencing the number of seats specified via section 329 and purchasing a number of tickets that equals the number of seats preferred by the customer 106.

The UI 324 can include a price per ticket preference section 331 that allows the customer 106 to specify price ranges or caps (i.e., a maximum price) relating to an amount he/she wishes to spend on an individual ticket. With reference to a price per ticket preference of the customer 106, the service 102 can exclude the customer 106 from consideration of tickets that are priced above the price per ticket preference specified in the price per ticket preference section 331.

The UI 324 can further include a day and time preference section 328 that allows the customer 106 to select one or more days of the week on which they would prefer to attend an upcoming event, as well as a time of day they would prefer to attend an upcoming event. In this example, the customer 106 has selected Friday, Saturday, and Sunday, as preferred days of the week, and 5-9 PM as the preferred time of day.

The UI 324 can further include an event type preference section 330 that provides a list of different types of events, such as music concerts, plays, operas, musicals, festivals, sports (including a drop down menu to select specific sports of interest, such as baseball, football, basketball, etc.), family shows, theater, and so on, for selection by the customer 106 as preferred event types they are interested in attending. Here, the customer 106 has selected music concerts, plays, festivals, and sports as preferred event types for consideration by the proactive ticket reservation service.

The UI 324 can further include a friend preference section 332 that allows the user to add friends from a social network to a list of friends that the proactive ticket reservation service 102 considers when deciding whether to reserve tickets for the customer 106. For example, the customer 106 can add his/her friend Bob to a list of friends via the fiend preference section 332. Thereafter the system may only reserve Joe Songbird tickets for the customer if Bob—who represents a social network connection of the customer 106 within a social network (e.g., Bob a friend of the customer 106 on Facebook®)—is also selected as a customer in a subset of customers 106 that are to have Joe Songbird tickets proactively reserved for them. Of course, any type of social network can be utilized for this purpose, such as any digital platform that provides users the ability to establish connections with other users via the platform. Thus, the customer 106 can add friends via the friend preference section 332 in order to attend upcoming events with friends and never have to go alone. In some embodiments, the system may also consider whether multiple tickets can be proactively reserved for the customer 106, and if so, despite adding a friend via the friend preference section 332, the system can still proactively reserve tickets for the customer 106 based on the notion that the customer 106 can share some of the reserved tickets with his/her friend. Ticket sharing features will be described in more detail below.

The customer settings module 206 can further provide, via the UI 300 or the UI 324, the ability for the customer 106 to specify other offers that he/she would like the service 102 to bundle with an offer to purchase proactively reserved tickets. For example, the customer 106 can specify that they prefer to receive offers for parking at a venue, dinner offers at restaurants located in a vicinity (within a threshold distance) of the venue, and so on.

Any and all settings and preferences specified by the customer 106 via the UIs 300 and 324 of FIGS. 3A and 3B can be saved in the database 112 in association with the customer account 114 of the customer 106. In this manner, the proactive ticket reservation service 102 can make the purchasing process more streamlined and easier for the customer 106 (e.g., by selecting seats, show dates, and the like, according to preferences specified by the customer 106). In addition, consideration of customer preferences ensures that proactively reserved tickets will match the customer's 106 expectations.

Returning to FIG. 2, the modules stored in the computer-readable memory 204 may include a proactive ticket reservation module 208. The proactive ticket reservation module 208, at a high level, is configured to receive various inputs, such as a number of tickets 132, a list of customer accounts 114, and customer-related data, such as the streaming data 116 and the purchase data 120, output a subset of customers 106 that have been assigned one or more of the tickets 132, and proactively reserve the tickets 132 for the subset of customers 106. In order to do this, the proactive ticket reservation module 208 can be configured to identify customers 106 as "fans" of an artist for an upcoming event based at least in part on the streaming data 116 and the purchase data 120 relating to those customers 106, compute artist scores for the identified customers 106, select a subset of the identified customers 106 for whom the tickets 132 are to be proactively reserved, and assign the tickets 132 to the individual customers 106 included in the subset. The proactive ticket reservation module 208 can also be configured to receive data indicating customer responses to electronic notifications and to reassign at least some of the tickets 132 based on the customer responses. For example, if an individual customer 106 does not end up purchasing one or more of the tickets 132 that are proactively reserved for the customer 106, the proactive ticket reservation module 208 can receive this information and determine whether to reassign tickets to other customers that were identified as "fans" of the artist for the upcoming event, or to put the unpurchased tickets into a pool of tickets that are to be made available in a sale window for the upcoming event.

In the process of identifying "fans" of an artist for an upcoming event, the proactive ticket reservation module 208 can utilize implicit signals, such as the streaming data 116 and the purchase data 120, to identify interest in the artist based on whether a customer 106 has streamed content about, or created by, the artist, or purchased items associated with the artist. In addition to these implicit signals, the proactive ticket reservation module 208 can utilize other implicit signals through various personalization techniques to determine whether customers are likely to be "fans" of an artist. Such personalization techniques can include, without limitation, collaborative filtering, content-based filtering, machine learning, and the like. Using collaborative filtering techniques, for example, the proactive ticket reservation module 208 can interest in an artist for any customer 106 in an affinity group based on interests of other customers in the same affinity group. For example, the system can determine that customers who like Amy Songwriter, also like Joe Songbird through collaborative filtering techniques. Thus, if the customer 106 streams a lot of music from Amy Songwriter, the proactive ticket reservation module 208 can deduce that the customer 106 might be interested in an upcoming Joe Songbird concert. Additionally, the proactive ticket reservation module 208 can consider explicit preferences obtained via the customer settings module 206, such as a preference for Joe Songbird that was explicitly provided by the customer 106.

The modules stored in the computer-readable memory 204 may include a notification module 210 that is configured to transmit electronic notifications, such as the electronic notification 144 of FIG. 1, to customers 106 that have been selected by the proactive ticket reservation module 208. The notification module 210 can be configured to transmit any type, and multiple types, of electronic notifications to a particular customer 106, such as email, SMS text, push notifications, and/or pre-roll notifications. The notification module 210 can also be configured to present banner notifications on a site (e.g., website) or client application downloaded from the provider of the proactive ticket reservation service 102 that are personalized to the customer 106 that accesses the site. For example, if the customer 106 accesses a website or client application of the provider, the computing device(s) 104 can identify the customer 106 based on credentials, or a device identifier used to access the site or client application, and, in response, present a banner notification on the site or client application informing the customer 106 of tickets that have been proactively reserved for the customer 106.

The modules stored in the computer-readable memory 204 may include a checkout manager 212 that is configured to receive customer responses indicating a confirmation to purchase tickets, and place orders for customers by charging a payment method of the customer 106 and scheduling tickets for delivery to the customer 106. The checkout manager 212 can be configured to access the customer account 114 of the customer 106 in question and lookup a default payment method that it uses to pay for the tickets purchased by the customer 106. The checkout manager 212 can charge the payment method of the customer at the start of a scheduled sale period (e.g., the start of the pre-sale window 128(A) shown in FIG. 1). The checkout manager 212 can be configured to access the customer account 114 of the customer 106 in question to lookup a default shipping address that it uses to schedule delivery of the tickets. The provider can utilize any suitable delivery mechanism to deliver tickets to customers, such as a delivery vehicle 214 (e.g., a delivery truck, van, unmanned aerial vehicle (UAV), etc.). Additionally, or alternatively, digital versions of tickets can be transmitted over the computer network 112 to the customers 106.

The modules stored in the computer-readable memory 204 may include a sharing module 216 that is configured to share tickets with friends and/or social network connections of customers 106 and/or determine relationships between customers 106 for determining seat assignments for customers 106. The sharing module 216 allows for customers who have multiple tickets proactively reserved for them to share subsets of those tickets with friends or social network connections. Accordingly, the sharing module 216 can receive requests from customers to share tickets, determine social network connections of customers, and cause electronic notifications to be transmitted to friends and/or social network connections of the customer 106. As another example, the sharing module 216 can identify, within a subset of customers for whom tickets are to be proactively reserved, social network connections between any two customers, and, in response, proactively reserve respective sets of tickets for "friends" that are contiguously located within a venue where an upcoming event is to occur.

FIG. 2 also illustrates that the networked computing device 108 of the customer 106 can be equipped with one or more processors 218 and one or more forms of computer-readable memory 220, which can be similar to the processor(s) 202 and computer-readable memory 220 described herein for the computing device(s) 104 of the proactive ticket reservation system. The computer-readable memory 220 may be used to store any number of functional, or executable, components, such as programs and program modules that are executable on the processor(s) 218 to be run as software. Each component stored in the computer-readable memory 220 may comprise computer-executable instructions that, when executed, cause the one or more processors 218 to perform acts and to implement techniques described herein. Each component may be in the form of data structures, program modules, or other data.

The memory 220 of the networked computing device 108 can store a client application 222 that is configured to receive and output electronic notifications at the networked computing device 108, as well as transmit (periodically, or at multiple different times), streaming data and purchase data to be stored as the streaming data 116 and the purchase data 120 within the database 112. This is particularly useful in scenarios where the customer 106 streams content, and purchases items, from other sources over the computer network 110, the other sources being different from the provider of the proactive ticket reservation service 102. In some embodiments, the client application 222 is configured to turn on a microphone(s) of the networked computing device 108 after receiving user consent to access the microphone of the networked computing device 108. Upon activation, the microphone can be used to collect audio data in the vicinity of the networked computing device 108. This may be useful in collecting information about streaming activity (e.g., capturing audio of music playing via speakers of the networked computing device 108, or via speakers of another device in the vicinity of the networked computing device 108). The client application 222 can be configured to process the audio in order to lookup a song matching the captured audio, or the client application 222 can transmit the captured audio over the computer network 110 so that the computing device(s) 104 of the service can process the audio data.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
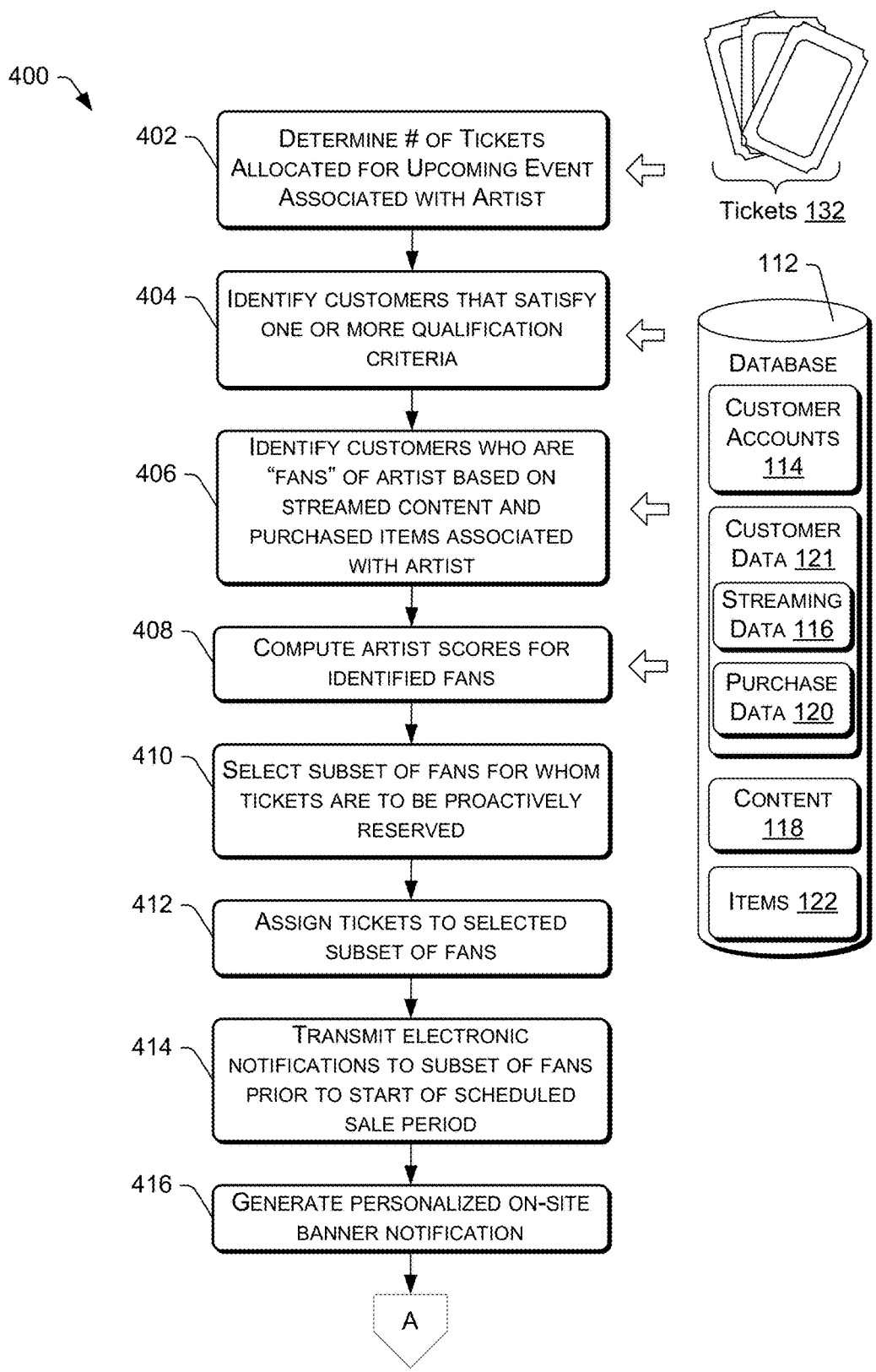
FIG. 4 is a flow diagram of an illustrative process for proactively reserving tickets for a customer based on music streaming and purchasing behavior.

FIG. 4 is a flow diagram of an illustrative process 400 for proactively reserving tickets for a customer 106 based on music streaming and purchasing behavior. For discussion purposes, the process 400 is described primarily with reference to the computer environments 100 and 200 of FIGS. 1 and 2.

As noted above, a proactive ticket reservation process, such as the process 400 of FIG. 4, is triggered automatically by the proactive ticket reservation service 102 prior to an initial sale window or period (e.g., the pre-sale window 128(A) shown in FIG. 1). For example, in response to receiving information relating to an upcoming event, and at any suitable time prior to a start of a scheduled sale period (e.g., the scheduled pre-sale window 128(A)) for an upcoming event, the proactive ticket reservation service 102 can trigger the process 400 by which a number of tickets 132 for the upcoming event are proactively reserved for customers 106 identified as potential "fans" of the upcoming event. As another example, if tickets to a venue for an upcoming date are expected to sell out, even in the absence of a specific event at the venue, the proactive ticket reservation service 102 can trigger the process 400. For example, tickets to a theme park on a holiday know to be a popular (or high demand) holiday, can be put through the process 400 to be proactively reserved on behalf of customers 106. At 402, the proactive ticket reservation module 208 can determine a total number of tickets 132 that that are to be proactively reserved on behalf of customers.

At 404, the proactive ticket reservation module 208 can identify customers that satisfy one or more qualification criteria. An example qualification criterion is satisfied if a customers is associated with a location that is within a threshold distance of the venue 124 where the upcoming event is to occur. For example, a customer 106 can specify a default shipping address for receiving deliveries of items (including tickets), and in this scenario, the criterion evaluated at 404 can include a determination of whether the default shipping address is within a threshold distance from the location (e.g., within 25 miles). This threshold distance can be based on an explicit preference set by the customer 106 via the customer settings module 206. Customers can also specify one or more additional locations via the customer settings module 206, and the criterion evaluated at 404 can include determining whether any one of the locations associated with the customer 106 are within the threshold distance. In this manner, the service 102 can filter customers based on location, and can exclude from consideration, those customers associated with a location(s) that are too far (e.g., beyond the threshold distance) from the venue 124 based on the notion that such customers are unlikely to travel over some threshold distance for the upcoming event. Of course, a customer 106 can specify, via the customer settings module 206, that they are willing to travel any distance to an event so as to not be excluded from consideration by such a criterion. Customers can specify such a preference for individual artists or for all events generally.

Another example qualification criterion is satisfied at 404 if a customer has been a paid subscriber of the proactive ticket reservation service 102 for at least a predetermined amount of time (e.g., at least a year). Identifying qualifying customers based on tenure of membership with the service 102 allows for filtering out customers who register or subscribe to the service 102 merely for the opportunity to receive tickets to an upcoming event that they have received news about, and nothing more.

Another example qualification criterion is satisfied at 404 if a customer has made a minimum number of purchases (e.g., at least three purchases) for items 122 available in an electronic marketplace of the proactive ticket reservation service 102. Such a criterion is an example of a signal that can indicate non-robotic activity to guard against Internet bots that are simply registering for the proactive ticket reservation service 102 to be afforded the opportunity to receive tickets 132. Because programmatic software entities typically do not make purchases of items 122 from an electronic marketplace, this criterion can be used to filter out programmatic software entities from inclusion in a set of customers that are to receive proactive reservations for tickets to an upcoming event.

Another example qualification criterion is satisfied at 404 if a customer has not received a proactive ticket reservation from the proactive ticket reservation service 102 for at least a predetermined amount of time (e.g., at least a month). This criterion can be used to filter out those customers who have recently (e.g., within the past month) had a ticket(s) proactively reserved for them by the service 102, which affords other customers a fair chance at having tickets proactively reserved for them. Customers can also set a frequency at which they would like to receive electronic notifications of proactively reserved tickets such that, if the system were to violate this frequency criterion by reserving a ticket for any given customer, the system can exclude the customer 106 from the set of qualifying customers identified at 404.

Another example qualification criterion is satisfied at 404 if a customer has explicitly opted into the proactive ticket reservation service 102. In some embodiments this "opt-in" criterion can be tailored to a specific artist such that the evaluation at 404 identifies those customers who have opted into the proactive ticket reservation service 102 and also set a preference for the artist for the upcoming event.

Another example qualification criterion is satisfied at 404 if a customer has not explicitly opted out of the proactive ticket reservation service 102. Not explicitly opting out of the proactive ticket reservation service 102 is different than explicitly opting in, and the service may consider all customers who have not opted out as a criterion for qualification.

At 406, for those qualifying customers that satisfy the one or more qualification criteria evaluated at 404, the proactive ticket reservation module 208 can identify, by accessing the customer data 121 maintained in the database 112, a plurality of customers 106 associated (i) with a venue that the tickets provide access to, or (ii) an artist of an upcoming event that is to occur at the venue. For example, as depicted at 406 of FIG. 4, the proactive ticket reservation module 208 can access the streaming data 116 to identify customers 106 who have streamed content 118 associated with the artist of the upcoming event, or the purchase data 120 to identify customers 106 who have purchased items 122 associated with the artist or the venue. For example, if the artist is Joe Songbird, the customer 106 may have, at some time in the past, streamed music (i.e., content 118) from Joe Songbird, and/or may have, at some other time in the past, purchased an item(s) 120 (e.g., merchandise, previous tickets, downloaded digital items, etc.) associated with the Joe Songbird. These instances of streaming content 118 and purchasing an item(s) 122 would be exhibited in the streaming data 116 and the purchase data 120, respectively, for the customer 106. Identification of other customers 106 can be performed at 406 in a similar manner until a plurality of customers (known as "fans" of the artist, Joe Songbird) are identified at 406. Streaming and purchasing behavior are taken as implicit signals that indicate interest in an artist associated with the content 118 streamed and/or the item(s) 122 purchased. Other implicit signals in the customer data 121 can also be considered at 406, such as social media behavior (e.g., "likes" or "sharing" of a fan-page of the artist), or any similar observable online behavior, such as a customer review of a venue or show that the customer attended, the customer having engaged in digital communications relating to a venue or an artist (e.g., opened an email, browsed the artist, etc.).

It is to be appreciated that content 118 and items 122 being associated with the artist—for purposes of identifying "fans" at 406—is not limited to content 118 or items 122 that are about, or created by, the artist; in fact, the content 118 streamed by the customer and/or items 122 purchased by the customer can be about, or created by, a different artist, yet such streaming and/or purchasing behavior can still indicate that the customer is potentially interested in the artist of the upcoming event. For example, various personalization techniques described herein, such as collaborative filtering, content-based filtering, machine learning, and so on, can be used to correlate artists so that behavior directed at one artist is indicative of an interest in the other. For example, at 406, the proactive ticket reservation module 208 can identify a "fan" of Joe Songbird based on determining, from the streaming data 116, that the "fan" streamed content 118 (e.g., music) created by Amy Songwriter. Here, Amy Songwriter can be correlated with Joe Songbird based on collaborative filtering (i.e., customers who like Amy Songwriter also like Joe Songbird). Similarly, a customer 106 who previously purchased Amy Songwriter merchandise might also be identified at 406 as a potential "fan" of Joe Songbird.

In addition to the implicit signals mentioned herein (e.g., steaming behavior, purchasing behavior, etc.), the proactive ticket reservation module 208 can additionally consider explicit signals for the identification of "fans" at 406. For example, if a customer 106 has previously specified, via the artist preference section 312 of the UI 300, that they are interested in the artist, Joe Songbird, this customer 106 may too be identified at 406 as a fan of the artist, Joe Songbird, based on the explicit signal received via the customer settings module 206.

At 408, the proactive ticket reservation module 208 computes respective scores for the plurality of customers 106 identified at 406. Computation of an score for an individual customer 106 can be based at least in part on a first statistic exhibited in the streaming data 116 relating to the content 118 associated with the artist that was streamed by the individual customer 106 and a second statistic exhibited in the purchase data 120 relating to the item(s) 120 associated with the artist that were purchased by the individual customer 106. In some configurations, the score can be determined based on a weighted formula that computes the score as a function of the first statistic (e.g., an amount of time the content 118 associated with the artist was streamed by the individual customer 106) and the second statistic (e.g., the number of the items 122 associated with the artist that were purchased by the individual customer 106). Different behaviors (e.g., streaming vs. purchasing) can be assigned different weights, and different statistics that are definable within the behaviors can each be assigned a unique weight. For example, streaming behavior may be weighted more heavily than purchasing behavior based on a preconceived notion that streaming content (e.g., music content) is a better indicator of interest in an artist than purchasing items associated with the artist, or vice versa. Even within streaming behavior, a first statistic regarding amount of time music content associated with an artist was streamed can be weighted more heavily than a second statistic regarding an amount of time video content associated with the artist was streamed, or vice versa. In general, weighting can be used to control the influence that each implicit signal has on the total score.

In addition to considering implicit signals (e.g., streaming statistics and purchasing statistics exhibited in the streaming data 116 and purchase data 120, respectively), the computation of artist scores at 408 can be further based on explicit signals, such as preferences for artists that have been previously specified by the customers 106 via the customer settings module 206. In some embodiments, explicit signals can be weighted more heavily than implicit signals in the weighted formula. For example, a first customer 106 that specifies, via the artist preference section 312 of the UI 300, Joe Songbird as being an artist of interest and who has streamed 40 hours of Joe Songbird music over a given time period might still receive a higher score than a second customer 106 who has not explicitly specified Joe Songbird as an artist of interest, but who has streamed 50 hours of Joe Songbird music over the same time period. This is because the weighted formula can consider the explicit preference for Joe Songbird as a stronger signal of interest in Joe Songbird than an implicit preference for Joe Songbird that is deduced from streaming content 118 associated with Joe Songbird.

In some embodiments, exponential smoothing of streaming statistics and purchasing statistics can be utilized in the computation of scores at 408. For example, exponential smoothing can be applied to raw statistics on the amount of time each customer 106 identified at 406 streamed content associated with the artist in question. Exponential smoothing of the raw data can mitigate the impact that huge outliers have on any given component of the weighted formula used to compute the score. For example, if a first customer 106 streamed 3000 hours of Joe Songbird music, and the next highest customer—in terms of hours of streamed content—is a second customer 106 that streamed 50 hours of Joe Songbird music, exponential smoothing can be applied to the raw streaming statistics so that the outlier who streamed 3000 hours of Joe Songbird music does not have a disproportionately high probability of obtaining tickets through the proactive ticket reservation service 102.

In some embodiments, the computation of scores at 408 can consider a temporal factor exhibited in the streaming data 116 and/or the purchase data 120, such as how recently a customer 106 streamed content 118 associated with an artist and/or purchased items 122 associated with the artist. For example, a first customer 106 that learns of an upcoming Joe Songbird concert, and who has never before streamed Joe Songbird music, may suddenly stream Joe Songbird music continuously for 24 hours solely in an attempt to get tickets to an upcoming Joe Songbird concert. Such as "short-term" fan can be weighted less favorably than a second customer 106 who can be identified as a "long-term" fan because the second customer 106 has streamed Joe Songbird music over a longer period of time. Even if the total hours of Joe Songbird music streamed by the second customer 106 is less than the total hours of Joe Songbird music streamed by the first customer 106 for a given period, so long as the streaming data 116 indicates that the second customer 106 has a longer history of streaming Joe Songbird music than the first customer 106, the second customer 106 may receive a higher score than the first customer 106, all else being equal. Additionally, or alternatively, exponential decay techniques can be utilized to weight recent actions more heavily than less recent actions in terms of the score computation at 408, based on the notion that more recent streaming and/or purchasing behavior is indicative of a current interest of the customer 106.

At 410, the proactive ticket reservation module 208 selects a subset of the plurality of customers 106 that are to be assigned tickets from the total number of tickets 132. Accordingly, the number of customers that can be included in the subset of customers at 410 is based on the number of available tickets 132 that are allocated for the process 400. The selection of the subset of customers at 410 can be based at least in part on a random lottery (using any suitable random, or pseudo-random, lottery selection algorithm), a weighted algorithm that factors in a level of "fandom" that customers have for the artist in question, or a combination thereof. One manner of gauging a level of "fandom" for each individual customer 106 identified at 406 is the artist scores computed at 408. In this manner, selecting the subset of the plurality of customers at 410 can be based at least in part on the respective scores computed at 408. For example, the plurality of customers 106 identified at 406 can be ranked according to their respective scores computed at 408, and the top "M" customers that are ranked the highest by score can be selected for ticket assignments at 410. In this scenario, if each customer 106 is to have four tickets proactively reserved for them, and if the number of tickets 132 determined at 402 is equal to 100 tickets, the proactive ticket reservation service 102 can select the top 25 customers 106 identified at 406 that have the highest scores. Depending on the statistics utilized to compute the scores at 408, this may result in selection of customers 106 at 410 with, for example, the most minutes or hours of Joe Songbird content 118 streamed over the last year, and/or selection of customers 106 at 410 that have, for example, purchased the most items 122 of Joe Songbird merchandise (or spent the most money on Joe Songbird merchandise).

Additionally, other factors that may not have been considered in the score computation can be considered at 410 for the selection of the subset of customers that are to receive ticket reservations. For example, the system can consider how recently individual customers have had tickets proactively reserved for them, and can more favorably weight customers who have never, or less recently, had tickets proactively reserved for them than customers who have more recently (e.g., within the past week) had tickets proactively reserved for them. Thus, a customer's chances of being selected in the subset at 410 can improve the longer they have gone without having tickets proactively reserved for them, giving customers a fair shot at obtaining tickets to upcoming events.

At 412, the tickets 132 are assigned to the customers in the subset selected at 410. Any number of tickets 132 can be assigned per customer in the subset, such as one ticket per customer, 2 tickets per customer, 3 tickets per customer, and so on. Attributes of each ticket 132 can be considered in the assignment of tickets 132 to the subset of customers. Attributes of an individual ticket 132 can include, without limitation, a seat, a date of the upcoming event, VIP classification, a price, and similar attributes. These ticket attributes can be compared to preferences of the customers (both explicit preferences and implicit preferences) to determine which tickets 132 to assign to which customers in the subset. In the absence of customer preferences, default ticket assignment algorithms can be utilized. For example, the assignment of tickets 132 at 412 can first consider day and seat preferences explicitly specified by each customer 106 in the subset of customers determined at 410. This can include preferences for VIP tickets, such that VIP tickets will go to customers that prefer VIP tickets. If there are more customers that prefer VIP tickets than the number of VIP tickets available, the VIP tickets can be assigned to the customers with the higher scores first, or they can be assigned based on another suitable factor. VIP tickets may not be automatically assigned to customers that have not otherwise specified a preference for VIP tickets due to the high price often associated with VIP tickets. Otherwise, tickets 132 with balcony seating will be preferably assigned to those customers who have specified balcony seating as a preference, for example, and tickets with weekend dates will be preferably assigned to those customers who have specified weekend days as a day of week preference.

In the absence of explicitly defined preferences, implicit preferences can be determined for ticket assignments at 412. For example, past ticket purchases of each customer can be analyzed to determine past seating chosen by customers in the subset. As such, tickets with particular seating and/or days of the week can be preferably assigned to customers who have previously purchased tickets with similar seating and/or days of the week.

In the absence of explicit and implicit preferences, the scores computed at 408 can be used to rank customers in the subset, and the proactive ticket reservation module 208 can begin assigning tickets 132 on the most popular days (e.g. weekends) and with the most popular seats first to the highest ranking customers in the subset. "Best available" seating logic and/or best available day logic can be used to determine the most popular days and seats.

It is to be appreciated that the assignment of particular tickets to particular customers at 412 may occur after receiving confirmation of a desire to purchase proactively reserved tickets from individual customers. In this scenario, as confirmations are received from individual customers, seats (and associated tickets) are assigned to those customers who respond on a first come, first serve basis. This incentivizes customers to promptly respond to the electronic notifications to get the best seats.

At 414, an electronic notification 144 can be transmitted over the computer network 110 to a customer 106 in the subset selected at 410, prior to the start of the scheduled sale period (e.g., the pre-sale window 128(A)). The electronic notification can be of any suitable form, such as an email notification, an SMS text message, a push notification delivered via the client application 222 on the networked computing device 108, and the like. In some embodiments, the electronic notification is configured to be output on a display 146 of the networked computing device 108, and the electronic notification can include logic configured to provide various interactive elements that the customer 106 can select via user input to the display 146, or by other input mechanisms (e.g., speech input), for responding to the electronic notification, as described briefly with reference to FIG. 1. Furthermore, the customer 106 can be given a specified time period in which to confirm or decline the purchase of one or more of the tickets that have been proactively reserved for the customer 106 at 412. This specified time period can begin upon transmitting the electronic notification at 414 and expire at or before the start of the scheduled sale period (e.g., the pre-sale window 128(A)).

In some embodiments, additional electronic notifications can be transmitted to those customers identified at 406 who were not selected for inclusion in the subset of customers at 410. Such an electronic notification can inform those customers identified as "fans" about the upcoming event so that the remaining customers can nevertheless discover the upcoming event before tickets go on sale to the general public, giving them an opportunity to buy tickets during the pre-sale and general sale windows. The additional electronic notification can also inform "fans" who weren't selected this time that their chances of being selected for a subsequent upcoming event of interest will improve. This can be effectuated through up-weighting customers in the selection algorithm at 410 based on a length of time since the customers were last selected for proactively reserved tickets at 410.

At 416, a banner notification informing the customer of the proactively reserved set of tickets can be generated for presentation on a website of the provider of the proactive ticket reservation service 102. Thereafter, in response to receiving a request from a networked computing device 108 of the customer 106 to access the website of the provider, a web page can be served to the networked computing device 108, the web page including the banner notification generated at 416. In this manner, if the customer accidentally deletes the electronic notification and doesn't have a way to retrieve the electronic notification, the customer 106 can still purchase the reserved tickets via the banner notification.

Figure 5:
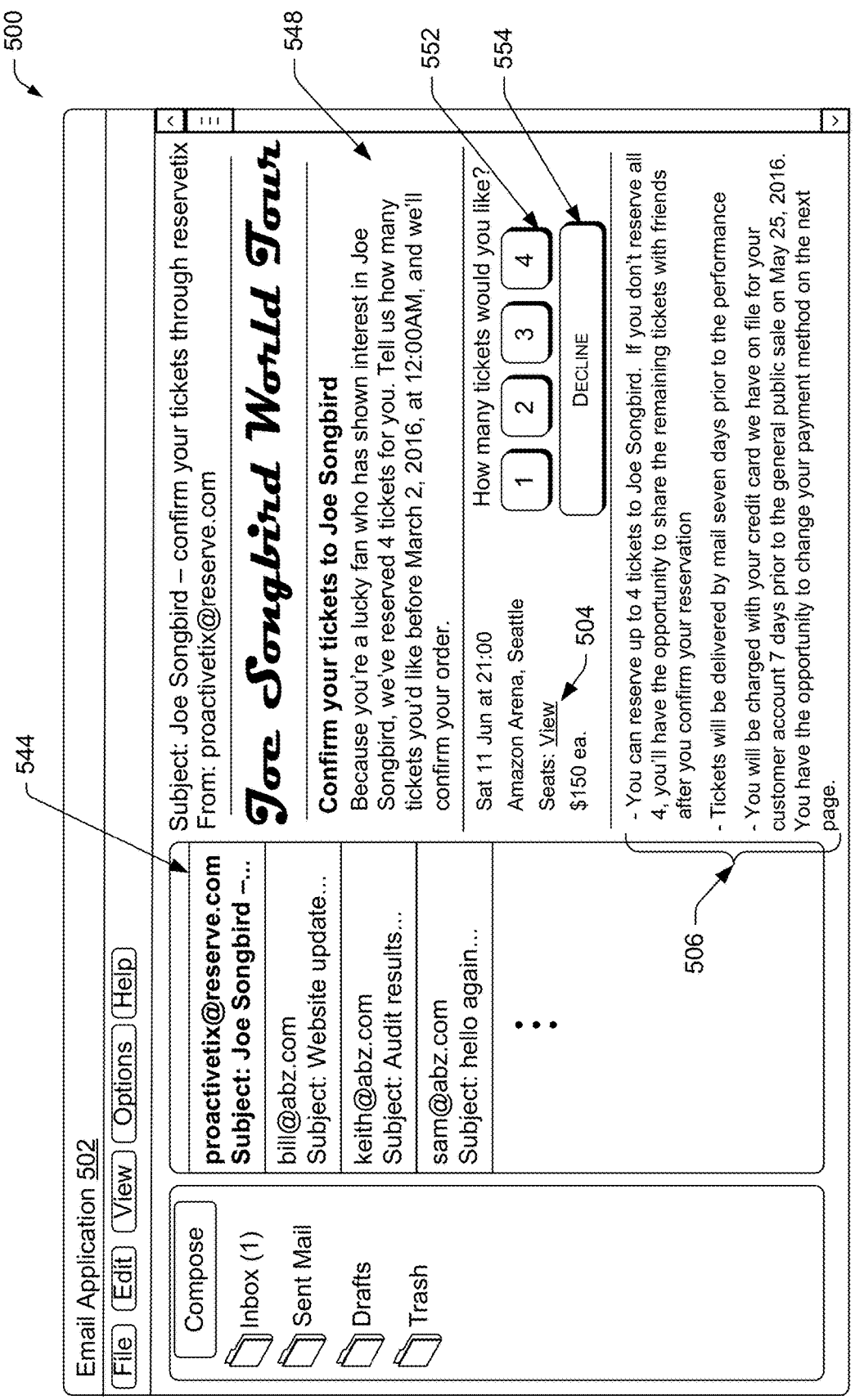
FIG. 5 illustrates an example user interface for displaying an electronic notification of proactively reserved tickets on a customer device.

FIG. 5 illustrates an example UI 500 for display of an electronic notification 544 of proactively reserved tickets on a networked computing device 108 of the customer 106. The electronic notification 544 is similar to the electronic notification 144 introduced in FIG. 1, however, the electronic notification 544 of FIG. 5 is in the form of an email, while the electronic notification 144 of FIG. 1 is in the form of a push notification received via the client application 222 of the networked computing device 108 of the customer 106.

As illustrated in FIG. 5, the customer 106 has received the electronic notification 544 in the form of an email in his/her inbox of an email application 502, which can be stored on the networked computing device 108, or accessed via a web browser, or via the client application 222. The electronic notification 544 can be received in response to its transmission at step 414 of the process 400. As shown in FIG. 5, the electronic notification 544 can include a message 548 informing the customer 106 that a set of tickets (in this example, four tickets) from the total number of tickets 132 have been proactively reserved for the customer 106 to purchase before an expiration of a specified time period that expires at or before the start of the scheduled pre-sale period. In the example of FIG. 5, the specified time period expires on Mar. 2, 2016, at 12:00 AM. Of course, the specified time period is configurable, but in some embodiments the specified time period from receipt of the electronic notification 544 to the expiration time is about 24 hours, giving the user ample time to decide whether to purchase tickets, and how many.

The electronic notification 544 can further include logic configured to provide various interactive elements, such as one or more selectable options 552 and a selectable option 554, that the customer 106 can select via user input to the display 146, or by other input mechanisms (e.g., speech input), of the networked computing device 108. FIG. 5 shows multiple selectable options 552 (shown as four square-shaped soft buttons, numbered 1, 2, 3, and 4, respectively) to purchase one or more tickets in the set of tickets assigned to the customer 106, similar to those shown in the electronic notification 144 of FIG. 1. It is to be appreciated, however, that a single selectable option can be provided (e.g., if a single ticket is reserved for the customer 106) in the form of a confirm button or the like. Additionally, or alternatively, soft buttons for selecting a number of tickets (e.g., the multiple selectable options 552 in FIG. 5) can be provided to select a number of tickets, and a soft "confirm" button can be provided separately in addition to the number ticket selection buttons.

As previously mentioned, in some embodiments, the customer 106 can pre-configure a physical button that is connected to a wireless network for confirming the purchase of proactively reserved tickets. Upon actuation of the physical button, the physical button (via a wireless transceiver built into the physical button) can transmit data via the wireless network to confirm purchase of the one or more tickets. The customer 106 can use the physical button as an alternative to providing input to the networked computing device 108. In an example scenario, the customer 106 might receive a push notification via his/her networked computing device 108 about a set of proactively reserved tickets that are exclusively available to the customer 106 for purchase, but the customer 106 find it easier to press the physical button that they have situated in a convenient location within the customer's 106 home, as compared to unlocking a smart phone with a personal identification number (PIN) in order to respond to the electronic notification 544. In another example scenario, perhaps the customer's 106 networked computing device 108 is often handled by his/her children. In order to avoid unwanted purchases of tickets by his/her children, the customer 106 may prefer to limit purchase confirmations to be made from the physical button in the customer's 106 possession. Thus, the physical button can be placed out of reach of the children (e.g., mounted high on a wall of the customer's 106 home) and depressed/actuated when the customer 106 would like to confirm the purchase of the one or more reserved tickets. The physical button, when actuated, can purchase a number of tickets that corresponds to a "number of seats" preference specified by the customer 106 via the customer settings module 206. Alternatively, the customer 106 can actuate the physical button a desired number of times for a desired number of tickets (e.g., actuate the physical button twice for two tickets).

FIG. 5 also shows a "decline" button 554 that, upon selection, can indicate the customer's 106 desire to affirmatively decline the option to purchase the proactively reserved tickets. The electronic notification 544 can include additional information, such as attributes of the upcoming event (e.g., a date and time of the event, a venue and/or location, etc.), as well as seating information and pricing information. A selectable link 504 can be provided in the electronic notification 544 that, upon selection, directs opens a web browser with additional information about the seats associated with the proactively reserved tickets. For example, a web browser with a seating map of the venue can be presented on the display 146 in response to selection of the link 504. Additionally, or alternatively, such a seating map or chart can be embedded within the electronic notification 544 itself and/or, upon selection of the link 504, an embedded seating map or chart can expand within the electronic notification 544 itself. Additional information 506 can be included in the electronic notification 544 informing the customer 106 about the ability to share any remaining tickets that are not purchased by the customer 106, how and when tickets will be delivered, as well as how and when a payment will be made for the tickets, and the ability of the customer to change a payment method and/or shipping address at any time prior to payment and/or delivery, respectively.

Figure 6:
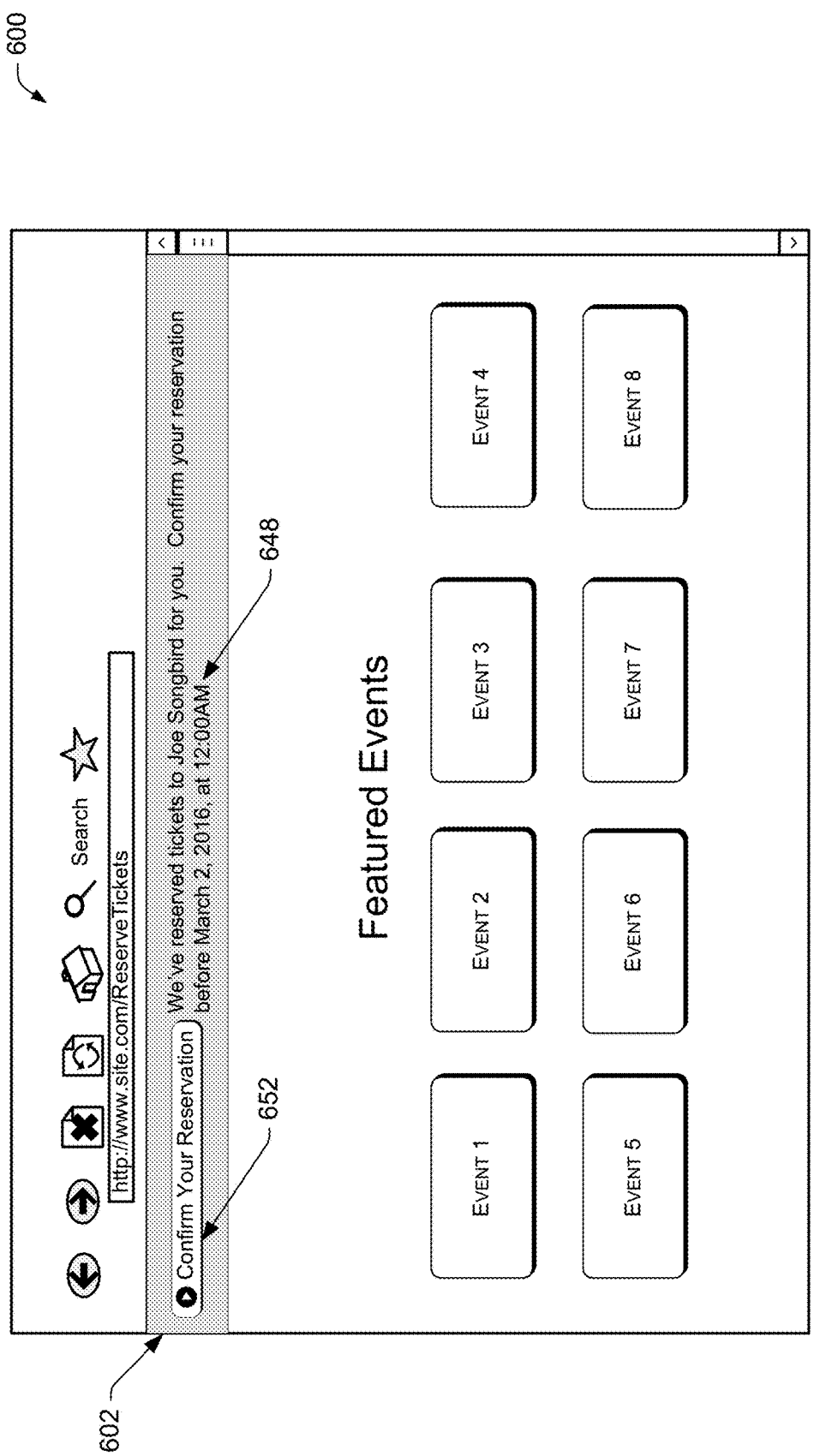
FIG. 6 illustrates an example user interface of an on-site banner notification for proactively reserved tickets.

FIG. 6 illustrates an example UI 600 of an on-site banner notification 602 for proactively reserved tickets. The banner notification 602 is an example of the banner notification that is generated at step 416 of the process 400. Much of the information in the banner notification 602 mimics the information in the electronic notification 544 that was transmitted to the customer 106 at step 414 of the process 400. As an illustrative example, prior to the expiration of the specified time period (e.g., the pre-sale window 128(A)), the customer 106 may enter a uniform resource locator (URL) address of the provider's website to access a website of the provider. This causes the computing device(s) 104 to receive, over the computer network 110, a request from a networked computing device 108 of the customer 106 to access the provider's website. The customer account 114 of the customer 106 can be automatically recognized from a device identifier or Internet Protocol (IP) address of the networked computing device 108, and/or from the customer logging into the customer account 114 via the website using credentials (e.g., a username and password). In response to identifying the customer 106 as being associated with the customer account 114, the computing device(s) 104 can serve a web page to the networked computing device 108, the web page having the UI 600 and including the banner notification 602 shown in FIG. 6. The banner notification 602 can include a message 648 informing the customer 106 that the set of tickets have been proactively reserved for the customer 106 to purchase prior to an expiration of a specified time period, as well as a selectable option 652 to confirm the purchase of the proactively reserved tickets. The banner notification 602 offers redundancy for the customer 106 in the event that the customer 106 accidentally discards the electronic notification 544 (e.g., by deleting the email), or if the customer 106 intentionally discards the electronic notification 544 and subsequently changes his/her mind about attending the upcoming event.

Figure 7:
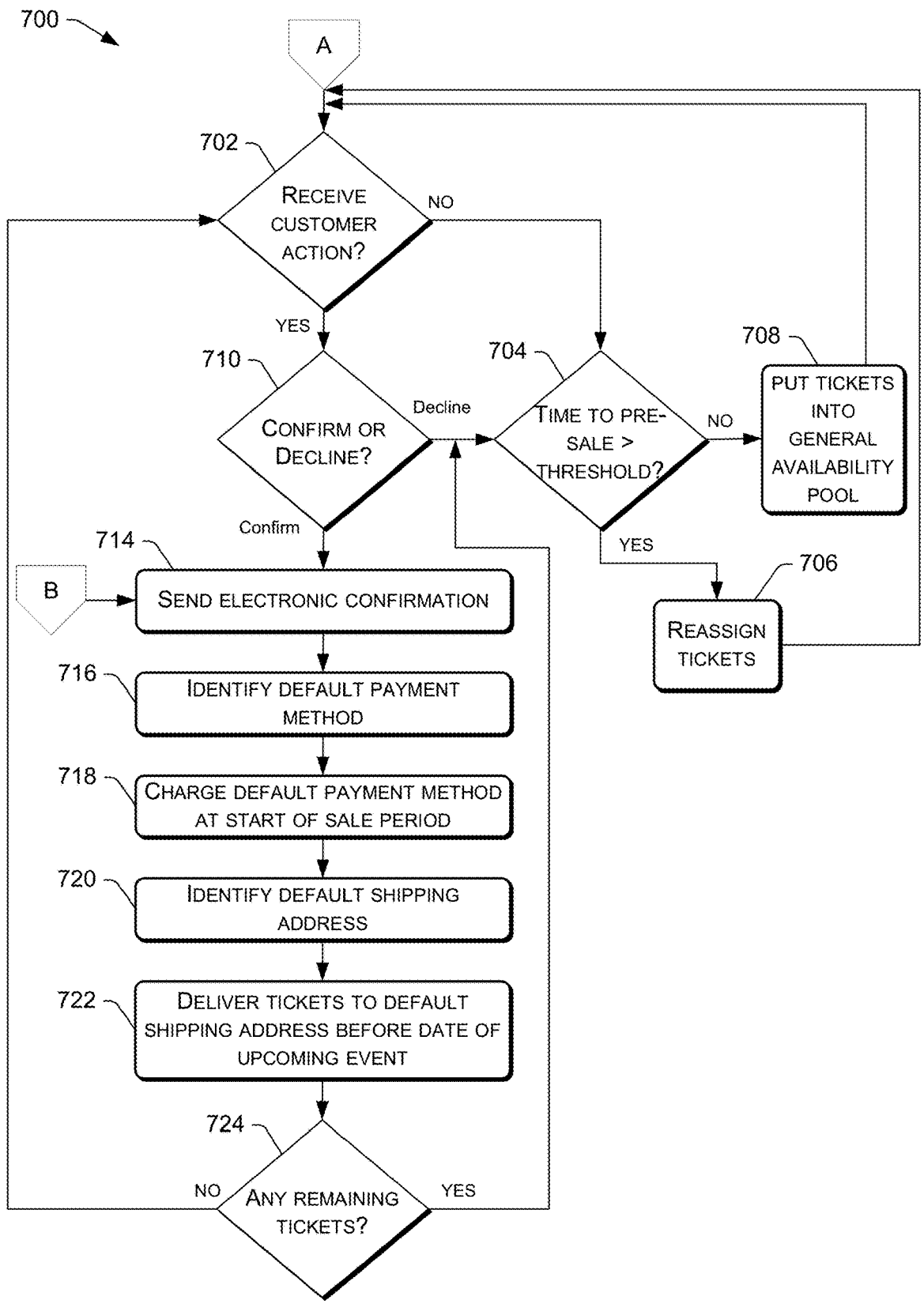
FIG. 7 is a flow diagram for an illustrative process for purchasing and delivering tickets to a customer, and for re-allocating remaining tickets based on user action or inaction.

FIG. 7 is a flow diagram for an illustrative process 700 for purchasing and delivering tickets to a customer 106, and for re-allocating remaining tickets based on user action or inaction. For discussion purposes, the process 700 is described primarily with reference to the computer environment 200 of FIG. 2. The process 700 may continue from step 416 of the process 400, as shown by the off-page reference "A" in FIGS. 4 and 7.

At 702, a determination can be made as to whether a customer 106 who received an electronic notification has responded to the electronic notification in the affirmative (i.e., confirming purchase of the reserved tickets) or in the negative (i.e., declining purchase of the reserved tickets) before the specified time period for responding has expired. This can be accomplished by monitoring a customer action (or input) relating to a selection of the one or more selectable options 152, 552, or the decline button 154, 554. If it is determined at 702 that the specified time period expired without any customer action (which can include no customer action, or a dismissal action, such as selection of the dismiss button 150), the process 700 follows the "no" route from 702 to 704 where it is determined whether an amount of time remaining until a start of a scheduled sale period (e.g., the pre-sale window 128(A)) is greater than a threshold amount of time (e.g., greater than 24 hours). If the time to the pre-sale window 128(A) is greater than the threshold amount of time at 704, the process 700 follows the "yes" route from 704 to 706 where the unclaimed tickets are either reassigned to a customer who was identified at 406 as a "fan" but who was not selected for inclusion in the subset at 410. This could be the customer with the highest score that was not selected for inclusion in the subset of customers at 410 who initially received electronic notifications of reserved tickets to the upcoming event.

If it is determined at 704 that the time to the pre-sale window 128(A) is less than, or equal to, the threshold amount of time, the process 700 follows the "no" route from 704 to 708 where the unclaimed tickets are put into a pool of tickets that will be offered during the scheduled sale period (e.g., the pre-sale window 128(A) when tickets are made generally available to customers).

If a customer action is received at 702 (e.g., confirming or declining purchase of the reserved tickets), the process 700 follows the "yes" route from 702 to 710, where a determination is made as to whether the customer action was a confirmation to purchase the reserved tickets or an action declining the purchase of the reserved tickets. If the customer 106 declined the offer to purchase proactively reserved tickets (e.g., via the decline button 154, 554 of the electronic notification 144, 544), the process 700 follows the "decline" route from 710 to 704, where the algorithm determines whether to reassign the unclaimed tickets or put them into the pool of pre-sale tickets, depending on the amount of time remaining until the start of the pre-sale window 128(A).

If it is determined at 710 that the customer 106 confirmed the purchase of the proactively reserved tickets (e.g., by selecting a number of tickets via the selectable options 152, 552 of the electronic notification 144, 544), the process 700 follows the "confirm" route from 710 to 714 where the notification module 210 sends an electronic confirmation to the customer 106 confirming the purchase of the desired number of tickets. The electronic confirmation transmitted at 714 can be in any suitable form, such as an email, SMS text, push notification via the client application 222, and so on.

At 716, the checkout manager 212 identifies a default payment method associated with a customer account 114 of the customer 106. At 718, the checkout manager 212 charges the default payment method an amount of the selected tickets (e.g., a total amount for two tickets if the customer 106 selected 2 out of 4 tickets). In some embodiments, the charging of the default payment method occurs at the start of the pre-sale period 128(A), which gives the customer 106 a chance, prior to the pre-sale period 128(A) to edit the order for the tickets (e.g., change seats, change the payment method from the default payment method to a different payment method, cancel the order, etc.).

At 720, the checkout manager 212 identifies a default shipping address associated with the customer account 114 of the customer 106. At 722, the purchased tickets are delivered to the default shipping address before the date of the upcoming event. This can include mailing physical tickets to the customer's 106 default shipping address via physical mail. Alternatively, delivery at 722 can include transmitting a digital version of the purchased tickets (e.g., electronic tickets) to the customer 106 (e.g., to an email address associated with the customer account 114, or making the electronic tickets available via the client application 22, a website of the provider of the service 102, etc.). Alternatively, delivery at 722 can be omitted from the process 700, and the tickets can be held at a will call office of the venue where the upcoming event is to occur.

At 724, a determination is made as to whether any tickets in the reserved set of tickets for the customer 106 remain unpurchased. For example, the customer 106 may have selected 2 out of 4 total tickets that were proactively reserved for the customer, leaving 2 remaining tickets that the customer 106 does not wish to purchase. If remaining tickets exist after the confirmation to purchase some of the tickets is received, the process 700 follows the "yes" route from 724 to 704, where the algorithm determines whether to reassign the unclaimed tickets or put them into the pool of pre-sale tickets, depending on the amount of time remaining until the start of the pre-sale window 128(A).

If it is determined at 724 that the customer has purchased all of the offered tickets, or purchased some and shared the rest, leaving no remaining tickets, the process 700 follows the "no" route from 724 back to 702 where the process 700 can iterate until another customer action is received. As shown in FIG. 7, the process 700 can also iterate after unclaimed/unpurchased tickets have been reassigned to another "fan" at 706 (arrow from 706 to 702), or put into a general availability pool at 708 (arrow from 708 to 702).

Figure 8:
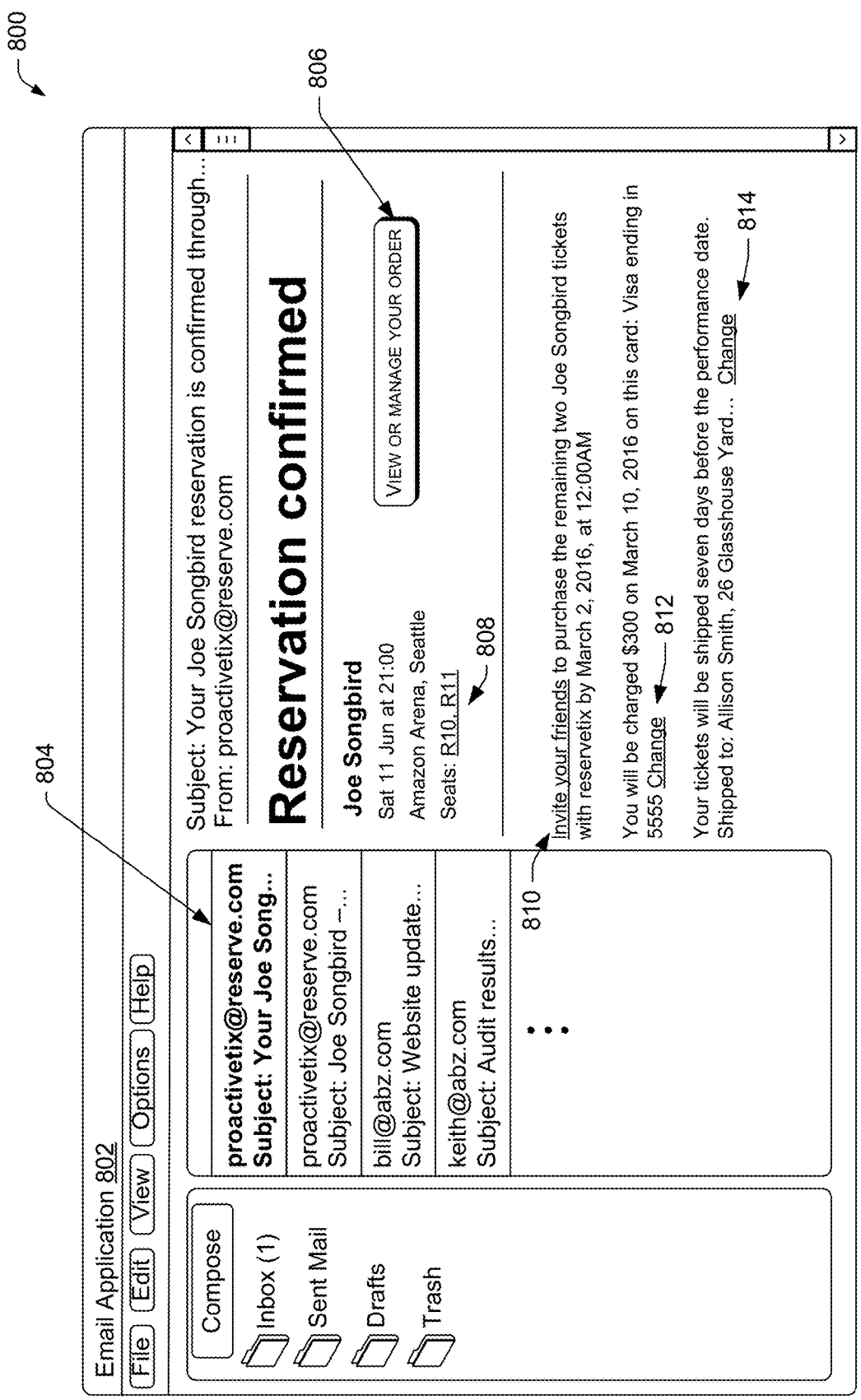
FIG. 8 illustrates an example user interface for displaying an electronic confirmation of purchased tickets on a customer device.

FIG. 8 illustrates an example UI 800 for displaying an electronic confirmation 804 of purchased tickets on a networked computing device 108 of the customer 106. The electronic confirmation 804 of FIG. 8 is shown in the form of an email. However, the electronic confirmation 804 could take any form, such as a SMS text message, a push notification received via the client application 222, a confirmation web page, and so on. It is to be appreciated that, for customers who set a preference via the customer settings module 206 to have tickets for upcoming events from particular artists automatically purchased on their behalf without any user action, the electronic notification 144, 544 transmitted at step 414 of the process 400 can be replaced with an electronic confirmation like the electronic confirmation 804 shown in FIG. 8.

As illustrated in FIG. 8, the customer 106 has received the electronic confirmation 804 in the form of an email in his/her inbox of an email application 802. The electronic confirmation 804 can be received in response to its transmission at step 714 of the process 700. As shown in FIG. 8, the electronic confirmation 804 can include a selectable option 806 to view or manage the customer's 106 order of proactively reserved tickets. Upon selection of the selectable option 806, the customer may be able to change seats, change the date of the event (if the artist is performing in another event on another date), edit a quantity of tickets purchased, and so on. Requests to change seats or to request a different event date, via the selectable option 806, can be serviced on a first come, first serve basis due to the limited inventory of tickets. A link 808 can be provided in the electronic confirmation 804 for selection that allows the customer 106 to view his/her seats, such as via a seating map or chart of the venue.

The electronic confirmation 804 can further include a selectable option 810 to share remaining tickets in the set of tickets with another user (e.g., a friend or social connection of the customer 106). The electronic confirmation 804 can further include a selectable option 812 to change a default payment method to a different payment method, and a selectable option 814 to change a default shipping address to a different shipping address.

Figure 9:
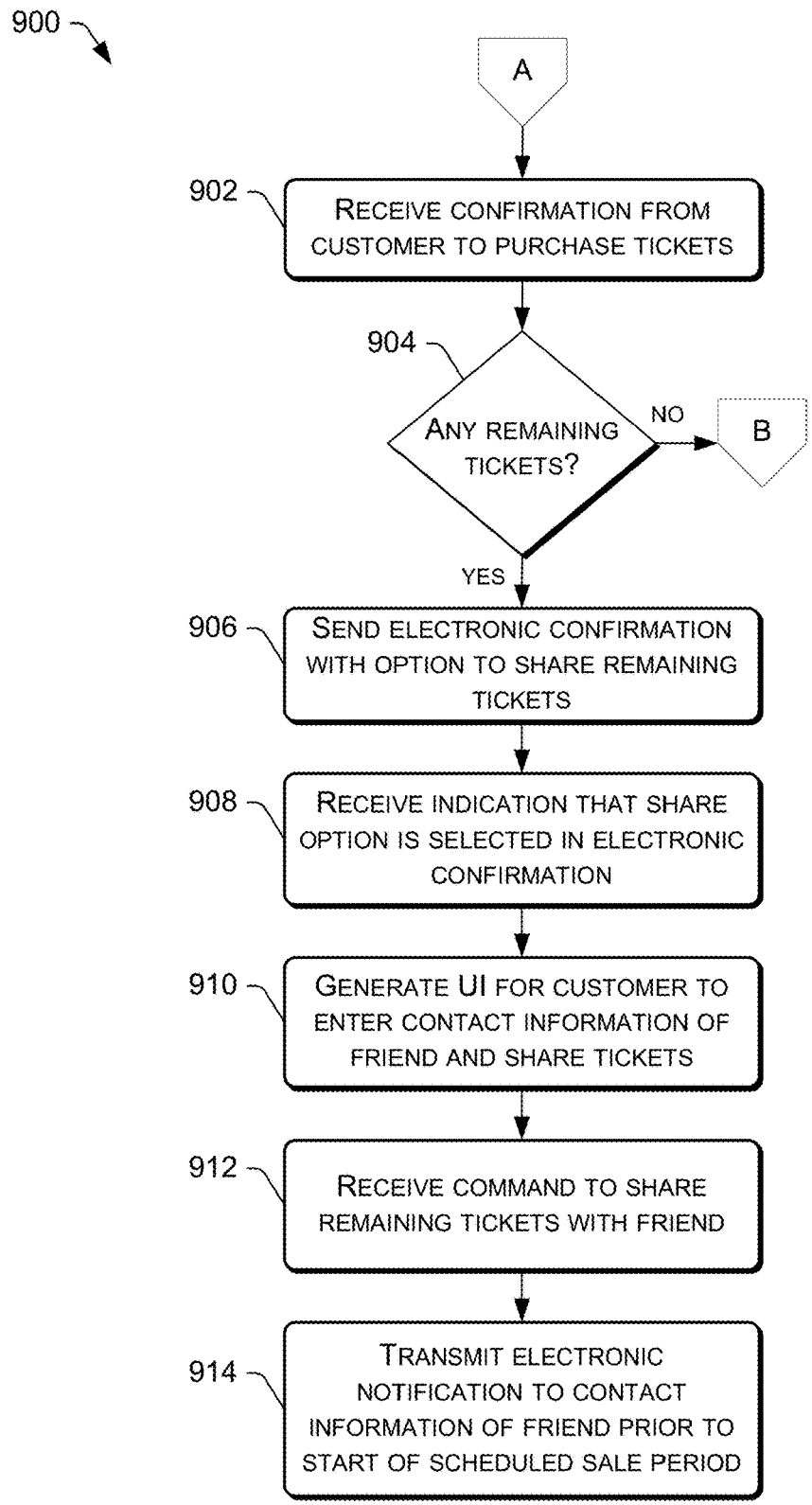
FIG. 9 is a flow diagram of an illustrative process for sharing tickets among friends.

FIG. 9 is a flow diagram of an illustrative process 900 for sharing tickets among friends. For discussion purposes, the process 900 is described primarily with reference to the computer environment 200 of FIG. 2. The process 900 may continue from step 416 of the process 400, as shown by the off-page reference "A" in FIGS. 4 and 9.

At 902, the proactive ticket reservation module 208 can receive data, from a networked computing device 108 of the customer 108 indicating a desire by the customer 106 to purchase tickets that were proactively reserved for the customer 106 and transmitted in the electronic notification 144, 544 at 414 of the process 400. At 904, a determination is made as to whether the customer selected a subset of the proactively reserved tickets (e.g., 2 tickets out of a total of 4 tickets reserved for the customer 106) and, therefore, that one or more tickets remain unclaimed (or unpurchased). If it is determined at 904 that the customer 106 purchased all of the tickets reserved for the customer and that no tickets remain unclaimed/unpurchased, the process 900 proceeds along the "no" route from 904 to 714 of the process 700, as shown by the off-page reference "B" in FIGS. 7 and 9, where the checkout manager 212 processes the transaction for the tickets for the customer 106.

However, if it is determined that tickets remain after confirmation of a ticket purchase (e.g., the customer 106 did not purchase one or more of the tickets that were proactively reserved for the customer 106), the process 900 follows the "yes" route from 904 to 906, where the notification module 210 transmits an electronic confirmation, such as the electronic confirmation 804, including an option 810 to share remaining tickets in the set of tickets with another user.

At 908, the sharing module 216 can receive data from the networked computing device 108 of the customer 106 indicating a selection of the option 810 to share the remaining tickets. At 910, the sharing module 216 can generate a user interface for the customer 106 to enter contact information of a friend (or social network connection) and to share the remaining tickets with the friend.

At 912, the sharing module 216 can receive data from the networked computing device 108 indicating a command to send an additional electronic notification to the contact information of the friend, as specified via the user interface generated at 910. At 914, and in response to receiving the command to share the remaining tickets at 912, the notification module 210 can share the remaining tickets with the friend of the customer 106 by transmitting the additional electronic notification to the contact information specified via the user interface. This electronic notification can be similar to the electronic notifications 144, and 544 described herein with reference to FIGS. 1 and 5. In some embodiments, the additional electronic notification can include a single "confirm" button as opposed to one or more selectable options to select a number of tickets.

Figure 10:
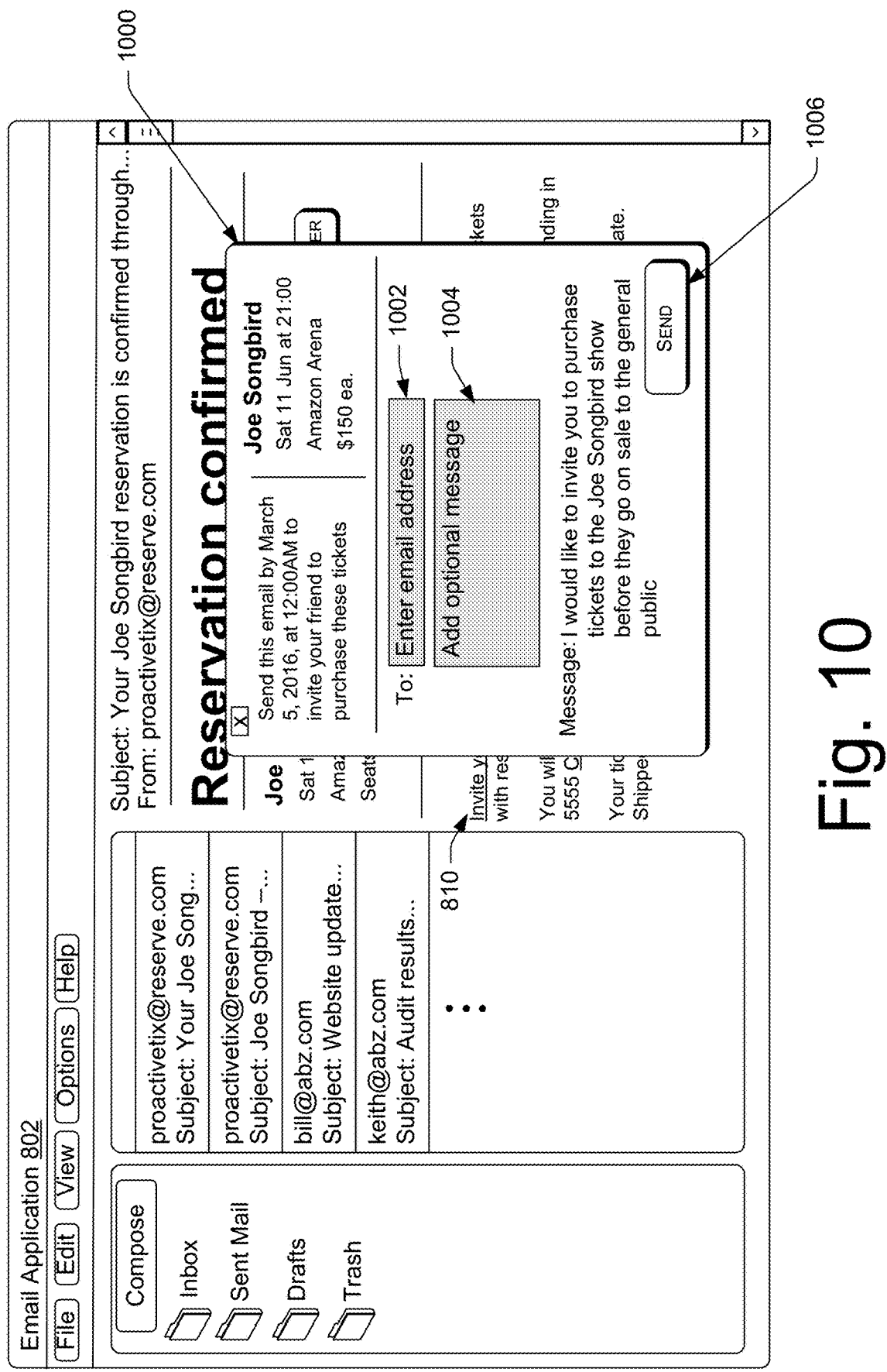
FIG. 10 illustrates an example user interface for displaying an option to share remaining tickets on a customer device.

FIG. 10 illustrates an example user interface (UI) 1000 for displaying an option to share remaining tickets on a networked computing device 108 of the customer 106. The UI 1000 can represent the UI that is generated at step 910 of the process 900. The UI 1000 is shown in the form of a pop-up window (or widget) that is presented on the networked computing device 108 in response to the customer 106 selecting the option 810 to share remaining tickets (from their set of proactively reserved tickets) with a friend. The UI can include a text field 1002 for entering contact information of a particular user (e.g., a friend, family member, social network connection) of the customer 106, such as an email address. Alternatively, the sharing module 216 can be configured to access social network data (e.g., social network contacts of the customer 106), and upon the customer 106 entering one or more initial letters of a name of a social network connection, the sharing module 216 can reference a list of social network connections and suggest matching names for selection by the customer 106. In this scenario, the contact information of the social network connection can be the social network profile of the customer that is accessible to the sharing module 216.

An additional text field 1004 can be provided for the customer 106 to add an optional message to the friend specified in the text field 1002. A selectable option 1006 can be provided in the UI 1000 for sending the offer to purchase the remaining tickets to the particular user specified by the customer 106, via the contact information of the particular user. Upon selection of the selectable option 1006 by the customer 106, the sharing module 216 can receive a command to share the remaining tickets (step 912 of the process 900), and subsequently, the notification module 210 can transmit an additional electronic notification to the contact information of the friend (step 914 of the process 900).

Figure 11:
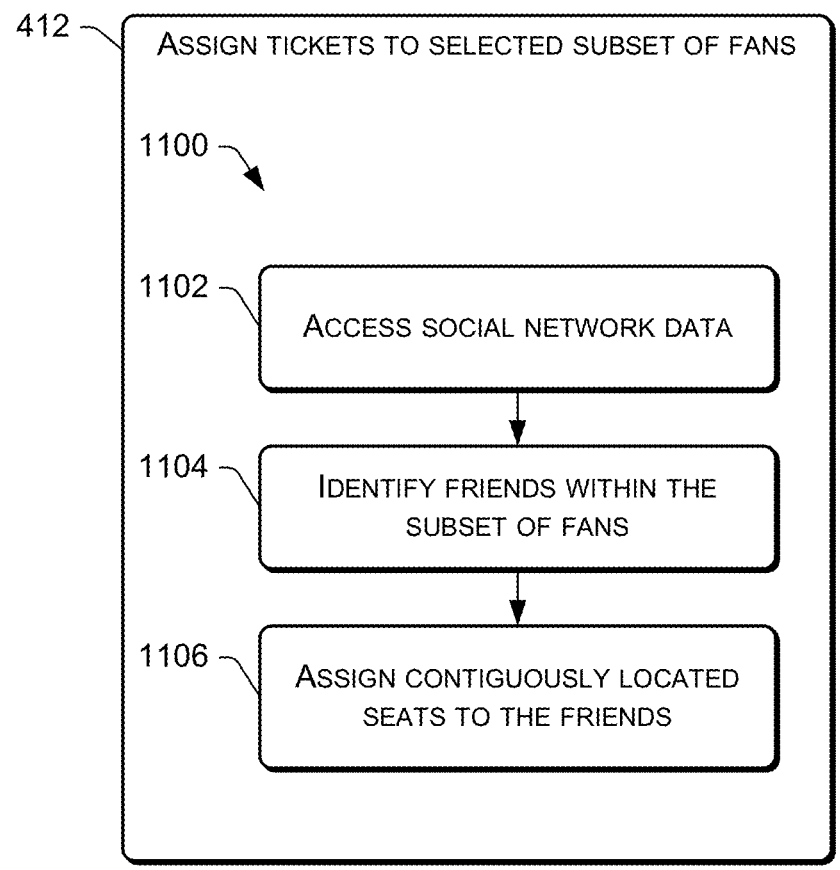
FIG. 11 is a flow diagram of an illustrative process for assigning contiguous seats to friends identified from social network data.

FIG. 11 is a flow diagram of an illustrative process 1100 for assigning contiguous seats to friends identified from social network data. The process 1100 can be a sub-process of step 412 in the process 400 that assigns tickets to the selected subset of fans who are to have tickets to an upcoming event proactively reserved for them.

At 1102, the proactive ticket reservation module 208 can access social networking data from the database 112 about its customers 106. For example, the provider of the proactive ticket reservation service 102 can allow customers 106 to invite other customers 106 to be friends, and can establish social network connections that are stored in the database 112 as social network data in association with the customer accounts 114. Additionally, or alternatively, social network data can be imported from other sources over the computer network 110, with the authorization of customers 106.

At 1104, the proactive ticket reservation module 208 can identify, based on social networking data accessed at 1102, social network connections between two customers that have been selected for inclusion within the subset of "fans" at 410. For example, the social network connections can comprise a first customer 106 and a second customer 106.

At 1106, the proactive ticket reservation module 208 can assign, or otherwise proactively reserving, respective tickets for each socially-connected customer that are contiguous each other. For example, a first set of tickets with seats 1-4 of row H can be assigned to the first customer 106, and a second set of tickets with seats 5-8 of row H can be assigned to the second customer 106, who is a social network connection of the first customer 106. In this manner, the first and second customers can be guaranteed to sit together at the upcoming event. In some embodiments, the electronic notifications that are sent to these socially-connected customers can reveal the fact that the seats assigned to each customer are contiguously located, within the venue, with the seats of the other customer.

Figure 12:
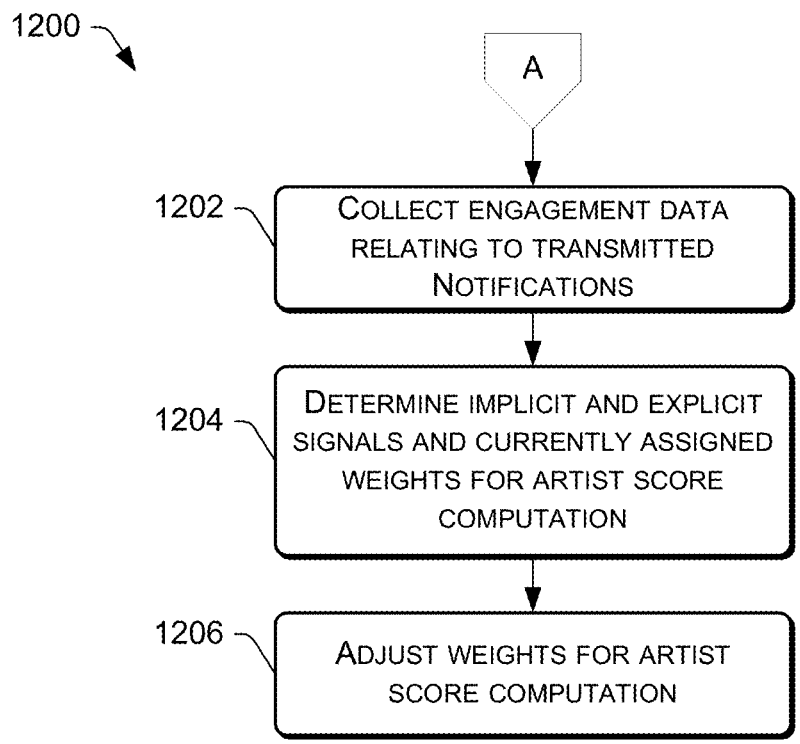
FIG. 12 is a flow diagram of an illustrative process for collecting engagement data regarding transmitted notifications and adjusting the weights used to determine fans of artists.

FIG. 12 is a flow diagram of an illustrative process for collecting engagement data regarding transmitted notifications and adjusting the weights used to determine fans of artists. For discussion purposes, the process 1200 is described primarily with reference to the computer environment 200 of FIG. 2. The process 1200 may continue from step 416 of the process 400, as shown by the off-page reference "A" in FIGS. 4 and 12.

At 1202, the proactive ticket reservation module 208 can collect engagement data relating to the subset of the plurality of customers that were selected for inclusion in the subset at 410, and who received electronic notifications transmitted at 414. The engagement data collected at 1202 can indicate a number of customers in the subset who confirmed interest in purchasing proactively reserved tickets, and/or a number of customers who explicitly declined to purchase the reserved tickets, and/or a number of customers who did not respond to the electronic notifications transmitted at 414.

At 1204, the proactive ticket reservation module 208 can determine the implicit and explicit signals that are currently used in the identification of "fans" and in the computation of scores, as well as the corresponding weights assigned to each signal. For example, the current weighted formula for computing scores for customers may have a first weight assigned to a playback statistic exhibited in the streaming data 116 that indicates an amount of time that content from a particular artist was streamed by a customer 106 via an associated networked computing device 108. If the engagement data collected at 1202 indicates that a high percentage of customers who streamed content associated with a particular artist did not confirm purchase of proactively reserved tickets to an upcoming event of the particular artist, this may indicate that streaming content is not as highly correlated with attending events (e.g., concerts) as previously thought.

At 1206, the proactive ticket reservation module 208 can adjust, based at least in part on the engagement data, one or more weights assigned to an implicit or explicit signal used in the computation of the scores for customers. For example, the first weight assigned to the playback statistic mentioned above can be adjusted downward if the engagement data indicates that some threshold percentage of customers who received electronic notifications based on the fact that they streamed content from the artist in question did not confirm purchase of the proactively reserved tickets in the electronic notification.

Other data can be collected in a similar manner to that of the engagement data described with reference to FIG. 12, such as opt-out rates from proactive reservation service 102 altogether, or data regarding a proportion of tickets purchased through the service 102 that are subsequently offered in the secondary marketplace, such as on a website that allows individuals to sell tickets they purchased to buyers over the Internet. Such data can be used similarly to adjust weights used in computing scores, based on the notion that the wrong customers are being selected by the proactive ticket reservation service 102, and adjustment to the selection algorithm can improve the targeting accuracy. Additionally, or alternatively, data indicating high opt-out rates, dismissals of notifications, and/or explicit decline commands can indicate that ticket offers are being transmitted to customers too frequently. Accordingly, this data can be used to adjust the cadence or frequency at which electronic notifications are transmitted to customers 106.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A ticket reservation system comprising:
a processor; and
memory storing computer-executable instructions that, when executed on the processor, perform operations comprising:
   causing content to be streamed to networked computing devices, individual ones of the networked computing devices associated with individual customers of a plurality of customers;
   tracking and collecting consumption data associated with the content as the content is streamed to the networked computing devices;
   determining, by the processor and prior to a start of a scheduled pre-sale period for an upcoming event relating to an artist, a total number of tickets to be reserved on behalf of the customers;
   retrieving, by the processor and from a database accessible to the ticket reservation system, the consumption data associated with the content and purchase data associated with individual customers of the customers, the consumption data associated with the content indicating a first amount of time music associated with the artist was streamed and the purchase data indicating a number of the items associated with the artist that were purchased;
   identifying, by the processor, the plurality of customers that have (i) streamed the music associated with the artist using networked computing devices or (ii) purchased the items associated with the artist using the networked computing devices based at least in part on an analysis of the consumption data associated with the content and the purchase data;
   computing, by the processor, respective scores for the plurality of customers, a score for an individual customer being determined based on a weighted formula that computes the score as a function of the first amount of time the music associated with the artist was streamed by the individual customer and the number of the items associated with the artist that were purchased by the individual customer;
   selecting, by the processor, a subset of customers of the plurality of customers based at least in part on the respective scores;
   transmitting, by the processor, over a computer network to a notification server, and prior to the start of the scheduled pre-sale period, an electronic notification to a customer in the subset of customers, the electronic notification configured to be displayed on a networked computing device of the networked computing devices, the networked computing device associated with the customer and including:
      a message indicating that a set of tickets from the total number of tickets have been reserved for the customer to purchase before an expiration of a specified time period that expires at or before the start of the scheduled pre-sale period; and
      logic configured to provide a selectable option to purchase one or more tickets in the set of tickets, wherein a number of the one or more tickets is less than a number of the set of tickets that were reserved for the customer;

receiving, by the processor, over the computer network, and prior to the expiration of the specified time period, additional data originating from the networked computing device of the customer, the additional data indicating that the selectable option has been selected;

in response to receiving the additional data indicating that the selectable option has been selected:
purchasing, by the processor, the one or more tickets on behalf of the customer; and
determining, by the processor, a number of remaining tickets in the set of tickets that the customer did not request to purchase;

determining, by the processor, that a second amount of time until the scheduled pre-sale period is equal to or greater than a threshold amount of time;

based at least in part on determining that the second amount of time until the scheduled pre-sale period is equal to or greater than the threshold amount of time, reassigning, by the processor, the number of the remaining tickets to a different customer of the plurality of customers that was not selected for inclusion in the subset of customers; and transmitting, by the processor and over the computer network, an additional electronic notification to the different customer informing the different customer that the number of the remaining tickets have been reserved for the different customer to purchase before the expiration of the specified time period, or a different specified time period.

2. The system of claim 1, the operations further comprising:
identifying, by accessing customer data associated with a customer account of the customer that is maintained in the database, a default shipping address for the customer and a default payment method for the customer;
charging the default payment method an amount for the one or more tickets at the start of the scheduled pre-sale period; and
sending the one or more tickets to the default shipping address of the customer prior to a date of the upcoming event.

3. The system of claim 1, wherein identifying the plurality of customers is further based on respective default shipping addresses for the plurality of customers being within a threshold distance of a venue where the upcoming event is to occur.

4. A method comprising:
determining, by a ticket reservation service prior to a start of a scheduled sale period associated with a venue, a total number of tickets that are to be reserved on behalf of customers;
identifying, by the ticket reservation service accessing customer data maintained in a database accessible to the ticket reservation service, a plurality of customers associated with the venue or an artist of an upcoming event that is to occur at the venue;
tracking music associated with the artist as the music is streamed to the network computing devices associated with the plurality of customers;
determining, based at least in part on the tracking of the music, an amount of time the music is streamed to the networked computing devices;
computing scores for individual customers of the plurality of customers, a score for an individual customer being determined based on a weighted formula that computes the score as a function of the amount of time music associated with the artist was streamed by the individual customer and a number of items associated with the artist that were purchased by the individual customer;
selecting a subset of customers of the plurality of customers;
transmitting, over a computer network to a customer included in the subset of customers, prior to the start of the scheduled sale period, an electronic notification informing the customer that a set of tickets from the total number of tickets have been reserved for the customer to purchase;
receiving data originating from a first networked computing device of the customer indicating a confirmation to purchase one or more tickets in the set of tickets, wherein a first number of the one or more tickets is less than a second number of the set of tickets that were reserved for the customer;
purchasing the first number of the one or more tickets on behalf of the customer;
determining a number of remaining tickets in the set of tickets that the customer did not request to purchase based at least in part on the first number of tickets and the second number of tickets;
determining that an amount of time until the scheduled sale period is equal to or greater than a threshold amount of time;
based at least in part on determining that the amount of time until the scheduled sale period is equal to or greater than the threshold amount of time and the number of remaining tickets is equal to or greater than one, reassigning remaining tickets in the set of tickets to a different customer of the plurality of customers that was not selected for inclusion in the subset of customers; and
transmitting an additional electronic notification to the different customer informing the different customer that the remaining tickets have been reserved for the different customer to purchase.

5. The method of claim 4, wherein:
receiving the data comprises receiving the data over the computer network and prior to an expiration of a specified time period that starts upon transmitting the electronic notification and that expires at or before the start of the scheduled sale period; and
the data is generated in response to at least one of: a reply to a short messaging service (SMS) text message, a response to a push notification delivered via a client application downloaded from the ticket reservation service to the first networked computing device, a selection of an embedded element included in an electronic mail (email) message, or a selection of a banner notification provided on a website associated with the ticket reservation service.

6. The method of claim 4, wherein selecting the subset of customers is based at least in part on the scores.

7. The method of claim 1, wherein:
the weighted formula applies at least one of (i) a first weight to a first statistic exhibited in the streaming data or (ii) a second weight to a second statistic exhibited in the purchase data;
the first statistic comprises at least one of: an amount of data consumed over the computer network while the content associated with the artist was streamed; and
the second statistic comprises at least one of: a dollar amount spent on the one or more items associated with the artist that were purchased.

8. The method of claim 7, further comprising:
collecting engagement data relating to the subset of customers, the engagement data indicating a number of customers in the subset of customers that explicitly confirmed interest in purchasing reserved tickets; and
adjusting at least one of the first weight or the second weight based at least in part on the engagement data.

9. The method of claim 4, wherein:
the content associated with the artist comprises at least one of:
content about, or created by, the artist; or
content about, or created by, a different artist that is correlated with the artist based on collaborative filtering or content-based filtering.

10. The method of claim 4, wherein identifying the plurality of customers is further based on one or more respective locations associated with the plurality of customers being within a threshold distance of a venue where the upcoming event is to occur, the one or more respective locations including at least one of: respective default shipping addresses of the plurality of customers, or preferred locations previously specified by individual ones of the plurality of customers.

11. The method of claim 4, wherein identifying the plurality of customers is further based on the plurality of customers satisfying one or more criteria comprising at least one of:
the plurality of customers having been paid subscribers of the ticket reservation service for at least a first predetermined amount of time;
individual ones of the plurality of customers having made a minimum number of purchases for items available in an electronic marketplace of the ticket reservation service;
the plurality of customers having not received a ticket reservation from the ticket reservation service for at least a second predetermined amount of time;
the plurality of customers having explicitly opted into the ticket reservation service; or
the plurality of customers having not explicitly opted out of the ticket reservation service.

12. The method of claim 4, further comprising assigning the set of tickets to the customer by:
identifying, by accessing preference data for the customer maintained in the database, a seat preference previously specified by the customer;
determining that tickets with seats that satisfy the seat preference are available; and
selecting the set of tickets with the seats that satisfy the seat preference.

13. A system comprising:
a processor; and
memory storing computer-executable instructions that, when executed on the processor, perform operations comprising:
causing content to be streamed to a plurality of networked computing devices;
collecting streaming data by tracking the content as the content is streamed to the plurality of networked computing devices;
determining, prior to a start of a scheduled sale period associated with a venue, a total number of tickets that are to be reserved on behalf of customers associated with the plurality of networked computing devices;
identifying, by accessing customer data and the streaming data maintained in a database, a plurality of customers associated with the venue or an artist of an upcoming event that is to occur at the venue;
selecting a subset of customers of the plurality of customers;
transmitting, over a computer network to a customer included in the subset of customers, prior to the start of the scheduled sale period, an electronic notification informing the customer that a set of tickets from the total number of tickets have been reserved for the customer to purchase;
receiving data originating from a first networked computing device of the customer indicating a confirmation to purchase one or more tickets in the set of tickets, wherein a first number of the one or more tickets is less than a second number of the set of tickets that were reserved for the customer;
purchasing the first number of the one or more tickets on behalf of the customer;
determining a number of remaining tickets in the set of tickets that the customer did not request to purchase based at least in part on the first number of tickets and the second number of tickets;
determining that an amount of time until the scheduled sale period is equal to or greater than a threshold amount of time;
based at least in part on determining that the amount of time until the scheduled sale period is equal to or greater than the threshold amount of time and the number of remaining tickets is equal to or greater than one, reassigning remaining tickets in the set of tickets to a different customer of the plurality of customers that was not selected for inclusion in the subset of customers; and
transmitting an additional electronic notification to the different customer informing the different customer that the remaining tickets have been reserved for the different customer to purchase.

14. The system of claim 13, wherein receiving the data comprises receiving the data over the computer network and prior to an expiration of a specified time period that expires at or before the start of the scheduled sale period.

15. The system of claim 14, the operations further comprising, in response to receiving the data:
transmitting, over the computer network and prior to the expiration of the specified time period, an electronic confirmation including an option to share the remaining tickets in the set of tickets with another user;
receiving second data from the first networked computing device indicating a selection of the option to share a subset of the remaining tickets, wherein the remaining tickets reassigned to the different customer are not included in the subset of the remaining tickets;
causing presentation, on a display of the first networked computing device, of a user interface to:
enter an electronic address of a particular user; and
send an additional electronic notification to the electronic address of the particular user to inform the particular user that the subset of the remaining tickets has been reserved for the particular user to purchase before the expiration of the specified time period, or a different specified time period; and
receiving third data from the first networked computing device indicating a command to send the additional electronic notification to the electronic address of the particular user.

16. The system of claim 13, the operations further comprising:
- receiving, over the computer network and prior to an expiration of a specified time period that expires at or before the start of the scheduled sale period, a request from the first networked computing device of the customer to access a website associated with the ticket reservation service; and
- in response to receiving the request to access the website, serving a web page to the first networked computing device, the web page including a banner notification informing the customer that the set of tickets have been reserved for the customer to purchase.

17. The system of claim 13, wherein the set of tickets comprise a first set of tickets, the operations further comprising:
- identifying, based on social networking data, a social network connection of the customer within the subset of customers; and
- reserving a second set of tickets for the social network connection of the customer that are contiguous with the first set of tickets.

18. The system of claim 13, wherein the customer data comprises streaming data indicating that the plurality of customers have streamed content associated with the artist or purchase data indicating that the plurality of customers have purchased one or more items associated with the venue or the artist, the operations further comprising:
- computing respective scores for the plurality of customers, a score for an individual customer being based at least in part on at least one of a first statistic exhibited in the streaming data relating to the content associated with the artist that was streamed by the individual customer or a second statistic exhibited in the purchase data relating to the one or more items associated with the artist that were purchased by the individual customer; and
- selecting the subset of customers based at least in part on the respective scores.

19. The system of claim 18, wherein:
- computing the respective scores is further based on a weighted formula that applies at least one of (i) a first weight to the first statistic exhibited in the streaming data or (ii) a second weight to the second statistic exhibited in the purchase data;
- the first statistic comprises at least one of: an amount of time the content associated with the artist was streamed, or an amount of data consumed over the computer network while the content associated with the artist was streamed; and
- the second statistic comprises at least one of: a number of the one or more items associated with the artist that were purchased, or dollar amount spent on the one or more items associated with the artist that were purchased.

20. The system of claim 13, the operations further comprising:
- selecting the subset of customers based at least in part on respective scores that are computed based on a weighted formula;
- collecting engagement data relating to the subset of customers, the engagement data indicating a number of customers in the subset of customers that explicitly confirmed interest in purchasing reserved tickets; and
- adjusting, based at least in part on the engagement data, at least one weight of the weighted formula.

* * * * *